United States Patent [19]

Remschel

[11] Patent Number: 6,154,631
[45] Date of Patent: Nov. 28, 2000

[54] LEARNING SYSTEM WITH SYNCHRONIZED CONTROL OF HARDWARE AND SWITCHING NETWORK

[75] Inventor: Ronald Remschel, Hewitt, N.J.

[73] Assignees: Sony Corporation, Tokyo, Japan; Sony Electronics, Inc., Park Ridge, N.J.

[21] Appl. No.: 08/988,203

[22] Filed: Nov. 14, 1997

[51] Int. Cl.[7] .................................................. G09B 3/00
[52] U.S. Cl. .......................... 434/350; 434/118; 434/322; 434/362
[58] Field of Search ................................. 434/350, 118, 434/322, 362

[56] References Cited

U.S. PATENT DOCUMENTS

| | | | |
|---|---|---|---|
| 4,767,335 | 8/1988 | Curt | 434/352 |
| 4,989,176 | 1/1991 | Khan | 710/4 |
| 5,002,491 | 3/1991 | Abrahamson et al. | 434/322 |
| 5,055,996 | 10/1991 | Keslowitz | 364/188 |
| 5,176,520 | 1/1993 | Hamilton | 434/350 |
| 5,204,813 | 4/1993 | Samph et al. | 434/362 |
| 5,263,869 | 11/1993 | Ziv-El | 709/204 |
| 5,267,865 | 12/1993 | Lee et al. | 434/350 |
| 5,310,349 | 5/1994 | Daniels et al. | 434/350 |
| 5,318,450 | 6/1994 | Carver | 434/336 |
| 5,437,555 | 8/1995 | Ziv-El | 434/336 |
| 5,458,494 | 10/1995 | Krohn et al. | 434/336 |
| 5,513,994 | 5/1996 | Kershaw et al. | 434/350 |
| 5,788,508 | 8/1998 | Lee et al. | 434/350 |
| 5,800,181 | 9/1998 | Heinlein et al. | 434/322 |
| 5,810,598 | 9/1998 | Wakamoto | 434/156 |
| 5,823,788 | 10/1998 | Lemelson et al. | 434/350 |
| 5,829,983 | 11/1998 | Koyama et al. | 434/118 |
| 5,904,485 | 5/1999 | Siefert | 434/322 |
| 5,915,973 | 6/1999 | Griffin et al. | 434/336 |

OTHER PUBLICATIONS

Sony: New Advanced Language Learning System. LLC–2000M System. 1993.
Sony: Computer–Controlled LL System. LLC–9000 System. Jun., 1990.
ASC Direction, Inc.: Recommended Equipment List for Mercy High School. DI8 Computer Controlled Multi Media Language Laboratory Thirty Position—Level IV. Nov., 1996.
Tandberg Educational: Instructions for the Teacher IS–11 Media Centre, 1995.
User Manual. Tandberg TLC–3000 "Prisma" GUI Software for TLC–1000. Aug., 1996.
Tandberg Education: Your Teaching Partner, Aug., 1996.
Robotel: The M160 System: A Revolution in Computer–assisted Training, 1994.
Robotel: M160 System—User Manual. 1994.
Tech Electronics: Control the Big Picture . . . Insight: Total Classroom Control At Your FingerTips. 1996.

*Primary Examiner*—Jessica J. Harrison
*Assistant Examiner*—Chanda Harris
*Attorney, Agent, or Firm*—Frommer Lawrence & Haug, LLP; William S. Frommer; Gordon Kessler

[57] ABSTRACT

A learning system is provided which includes a plurality of student units for use by students, a teacher unit for use by a teacher, and a plurality of master storage devices that store information reproduced by the student units. The learning system includes a computer for use also by the teacher that operates to control each of the student units. The teacher computer operates to control the switching device to couple a selected student computer(s) with the teacher computer so that the teacher computer provides the function of controlling in various manners the operation and function of the selected student computer(s). The teacher computer may provide its own display to the display of the selected student computers. The teacher computer can control the switching device to blank the monitors of selected student computers. The teacher computer also may be used to control a selected student computer by means of its own keyboard and mouse wherein the specific selections made by the teacher operate the selected student computer as if those selections were performed on the selected student computer's own keyboard and mouse.

51 Claims, 22 Drawing Sheets

SYSTEM CONFIGURATION ☒

| Password | Time Format | LLC Power | LLC Keys |
| A/V Devices | Comm Port | CA/LL | Institution | Seat Numbers |

Enter the data to be displayed as Seat Numbers when being viewed
(up to 3 characters each - no spaces)

| 57 | 58 | 59 | 60 | 61 | 62 | 63 | 64 |
|----|----|----|----|----|----|----|----|
| 49 | 50 | 51 | 52 | 53 | 54 | 55 | 56 |
| 41 | 42 | 43 | 44 | 45 | 46 | 47 | 48 |
| 33 | 34 | 35 | 36 | 37 | 38 | 39 | 40 |
| 25 | 26 | 27 | 28 | 29 | 30 | 31 | 32 |
| 17 | 18 | 19 | 20 | 21 | 22 | 23 | 24 |
| 9  | 10 | 11 | 12 | 13 | 14 | 15 | 16 |
| 1  | 2  | 3  | 4  | 5  | 6  | 7  | 8  |

Current settings of "User Options" will be set as default on start-up.

OK
Cancel All
Print
Help

FIGURE 7

Class Roster Data C:\VB4\LLC8000\SPANISH3.ROS ☒

| Class Data | Student Data | Pattern File | Font |

Seat Number: 1

Name to Display: Dave

First Name: David

Last Name: Marr

ID: 234-32-3434

Grade/Year: 11

Notes: 11/23/96

[Date Stamp]

Analyzer Data
- Test Number: 1
- Test Weight: 1
- Test Score: 80.0
- Ave. Score: 95.7%

Times Absent: 1

[OK] [Cancel All] [Help]

[Previous] [Next] [Clear Entry]

FIGURE 9

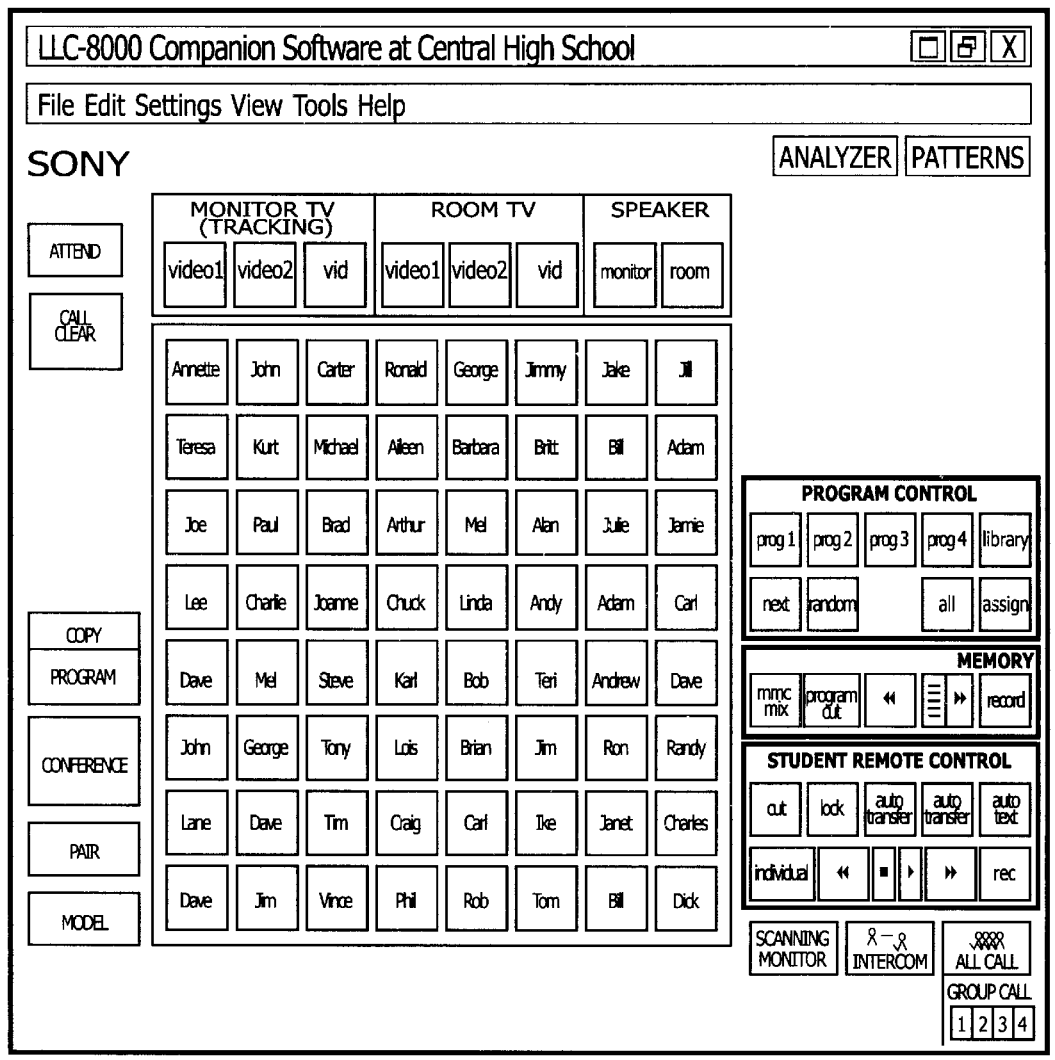
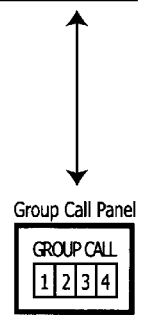
FIGURE 14

| S | > | S | > | S | > | S | > |
|---|---|---|---|---|---|---|---|
| S | > | S | > | S | > | S | > |
| S | > | S | > | S | > | >> | > |
| S | DRL | S | > | S | > | NT | > |
| S | >> | S | > | S | > | S | > |
| S | > | EOT | << | S | > | S | > |
| S | > | << | > | S | > | NT | << |
| S | > | EOT | > | S | > | S | >> |

| Display | Student Deck Mode |
|---|---|
| S | Stop |
| > | Play |
| >> | Fast Foward |
| << | Rewind |
| NT | No Tape in the student DEck |
| EOT | The tape has reached the beginning/end |
| 2x> | 2 times normal speed play |
| REC | Record |
| 2xR | 2 times normal speed record |
| DRL | Drill Recording |
| RP | The tape in the student deck is record protected |
| AA | Audio Active Panel (EA-80) |

FIGURE 16

Sony Analyzer Results

STUDENT RESULTS

Student Scores

| Name | Score |
|---|---|
| Marr, Dave | 0.0% |
| Imai, Junko | 0.0% |
| Giovonco, Vince | 0.0% |
| Cathcart, Phil | 0.0% |
| Witherspoon, Rebecca | 0.0% |
| Black, Tom | 0.0% |

Detailed Information
Marr, Dave

| Question | Correct | Responses |
|---|---|---|
| 1 | 2 | |
| 2 | 4 | |
| 3 | 5 | |
| 4 | 1 | |
| 5 | 2 | |
| 6 | 2 | |
| 7 | 5 | |

CLASS SUMMARY

CLASS AVERAGE 0.0%

| Question Number | Correct Response | Response Ratio | Correct Ratio |
|---|---|---|---|
| 1 | 2 | 0% | 0.0% |
| 2 | 4 | 0% | 0.0% |
| 3 | 5 | 0% | 0.0% |
| 4 | 1 | 0% | 0.0% |
| 5 | 2 | 0% | 0.0% |
| 6 | 2 | 0% | 0.0% |
| 7 | 5 | 0% | 0.0% |

Archive Results

☐ Student Scores  ☑ Student Detail Information
                  ⦿ Selected Student
☐ Class Summary   ○ All Students

[Print] [Save to File] [Close]

FIGURE 21

LEARNING SYSTEM WITH SYNCHRONIZED CONTROL OF HARDWARE AND SWITCHING NETWORK

BACKGROUND OF THE INVENTION

The present invention relates generally to a learning system with random assignments, conferencing, modeling and synchronized control of hardware and switching network, and more particularly to a learning system, such as a language learning system, having a synchronization feature in which student computers are controlled by a teacher computer by means of a teacher computer controlled switching network.

Various existing learning systems, including language learning systems, are comprised of a number of student consoles and a teacher console. A teacher of a class utilizes the teacher console to monitor students during the instruction of a specific subject such as a foreign language. Some language learning systems supply the teacher, after the commencement of a test, with the students' test results and further include the capability of allowing the teacher to maintain notes within the language learning system on each of the students. Current language learning systems further provide the capability of allowing a teacher to setup a "conference", wherein selected students are able to communicate with one another via their respective headphones and microphones.

Although current language learning systems have advanced well beyond the more traditional utilization of a single tape recorder to teach a foreign language, existing devices have various shortcomings. For example, current systems do not integrate individual student data into the education process, and do not allow for the teacher to see who she/he is working with. Further, such systems do not allow for the easy compilation of various data (e.g., the student answers). Still further, such systems do not automatically analyze student responses, and do not provide for the automation of student testing. Finally, current systems simply remain difficult and time-consuming to use requiring the teacher to spend more time operating the system and less time interacting with and teaching the students.

OBJECTS OF THE INVENTION

Accordingly, it is an object of the invention to provide an improved learning system which overcomes the shortcomings of existing learning devices.

A further object of the invention is to provide an improved learning system having a graphical user interface which provides for the easy coupling of student and class data to specific interface/input devices.

Another object of the invention is to provide an improved learning system which allows for the random assignment of students to various groups.

Still, an additional object of this invention is to provide for the synchronized control of the learning system hardware and a personal computer/RGB/mouse switching network.

Various other objects, advantages and features of the present invention will become readily apparent to those of ordinary skill in the art, and the novel features will be particularly pointed out in the appended claims.

SUMMARY OF THE INVENTION

In accordance with one embodiment of the invention, a learning system and corresponding method are provided with a plurality of student units for use by students, a plurality of master units and a teacher unit. The teacher unit includes a computer having a graphical user interface that operates to control the student units to record student responses/answers, to control selected student units to reproduce the respective recorded information in a predetermined format, and to control the master unit(s) to record the information output by the selected student units.

As one aspect of the present invention, the teacher computer displays teacher selected information to the teacher and in response to the supply by the teacher of display information that identifies a selected student computer to control, the teacher computer controls the switching device to supply the displayed teacher selected information to the selected student computer so that the display of the selected student computer only displays the teacher selected information.

As a feature of this aspect, the teacher selects one of the functions displayed in a switcher panel on the teacher computer monitor to initiate control of the selected student computer, and in response thereto, the switcher panel is removed from the teacher computer display.

As another aspect of the present invention, each of the students is assigned to one of a plurality of groups, and the teacher may select a particular group of students to control the computers thereof.

As yet a further aspect of the present invention, the teacher by means of the teacher computer can control the switching device to blank the displays of selected student computers.

As yet another aspect of the present invention, upon selection of a student computer to control, the teacher by means of the keyboard and mouse of the teacher computer is able to control the selected student computer as if the keyboard/mouse entries are being performed on the keyboard and mouse of the selected student computer.

As a feature of this aspect, the selected student computer is inhibited from receiving instructions from its own keyboard/mouse when it is being controlled by the teacher computer.

As another feature of this aspect, the teacher computer operates to control the selected student computer for a pre-selected amount of time.

As yet a further feature of this aspect, the teacher computer is inhibited from being controlled by the teacher during control of the selected student computer.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 7 is an illustration of a window of the companion software showing seat numbers of the student stations;

FIG. 9 is an illustration of a window of the companion software showing various student data of a selected student in a class;

FIG. 14 is an illustration of the main window of the companion software having a group call panel;

FIG. 16 is an illustration of student unit status data included in the main window of the companion software;

FIG. 21 is an illustration of an exemplary analyzer results dialogue which provides analysis data pertaining to student responses;

DETAILED DESCRIPTION OF THE PREFERRED EMBODIMENTS

The learning system described herein is a computer-assisted learning laboratory. It is a highly intelligent, yet user-friendly, system which allows a teacher to efficiently control and track a variety of classes and to conduct effective lessons according to the specific needs of the students.

During the process of learning a foreign language, or during the process of learning anything new, a crucial aspect of such learning is the introduction of audio and visual material to the student. The learning system discussed herein enables the teacher to easily incorporate an audio lesson with corresponding video material. This combined with the pairing of students for conversation practice or selecting a student to be a "model" voice (discussed below) provides for a variety of learning stimuli. The language learning system of the present embodiment further enriches speaking and listening skills for students by integrating the language learning system with personal computers thus providing a computer-assisted laboratory. Testing and recording of student responses may be automated, so that grading may take place in a more user friendly manner. Finally, the language learning system of the present invention allows for the compilation and manipulation of data for each student in a roster file. Thus, various data, including for example test scores, attendance records and assignment completion records, may be maintained on each student. It is then possible to view this information, or to assign certain projects or the like to particular students based upon the status of various data of the roster file.

Figure 1:
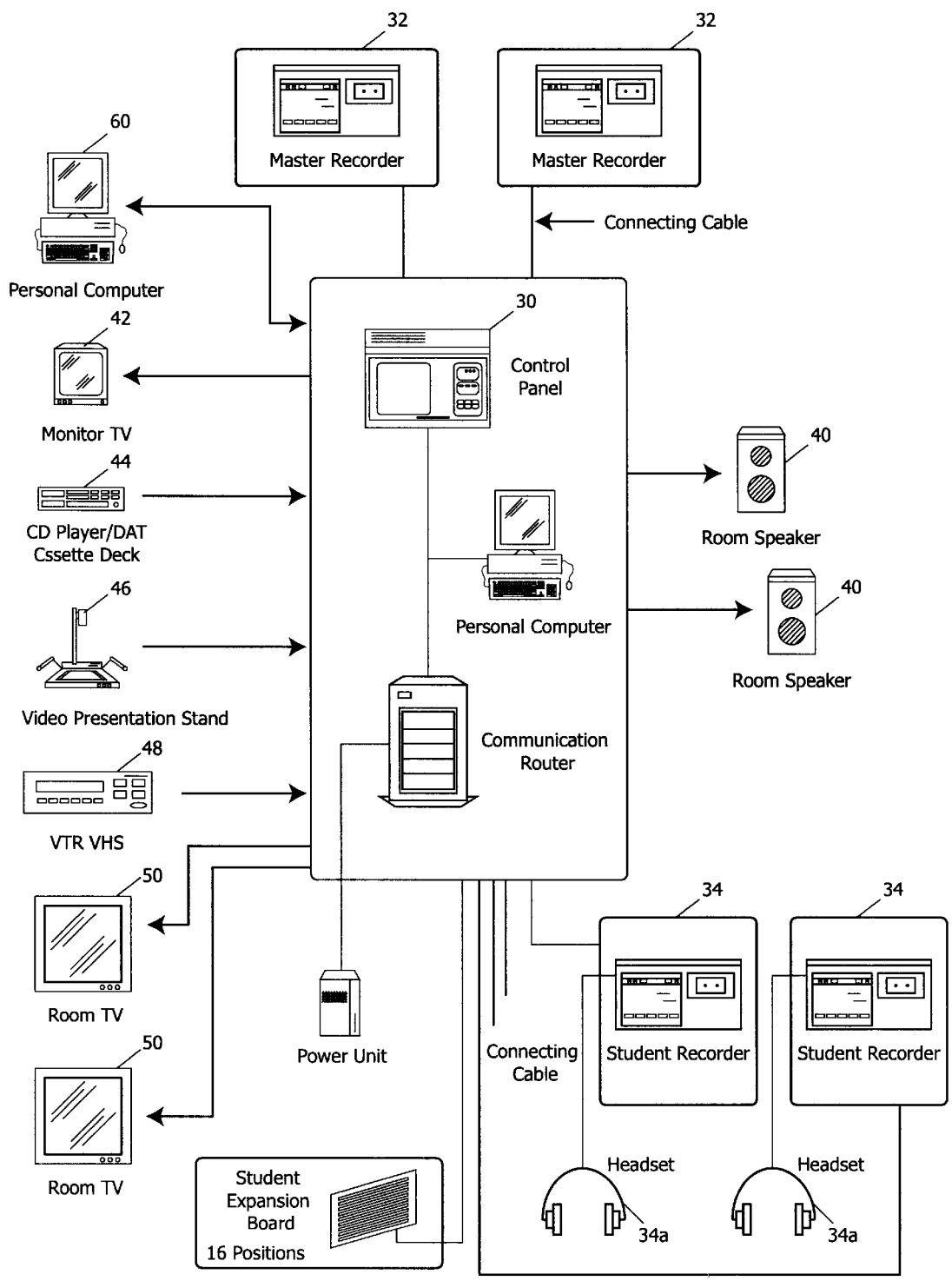
FIG. 1 is an exemplary system configuration of the learning system of the present invention.

Referring now to the drawings, FIG. 1 illustrates an exemplary system configuration of the learning system of the present invention. As shown, the system is comprised of a teacher unit 30 which includes a personal computer (PC) and a control panel, a number of master recorders (e.g., tape recorders) 32, a number of student recorders 34, and various optional accessory equipment, including room speakers 40, a television monitor 42, a CD player/DAT cassette deck 34, a video presentation stand 46, a video tape recorder 48, and a number of television sets 50. In addition, the learning system may include at least one additional personal computer 60 that operates to aid in control the language learning system, or allow for additional input or output avenues, in accordance with the present invention. Of course, many of the recording and playback devices may be substituted for each other. For example, the tape recorders may be provided as a digital storage or playback devices, or the like. Additionally, any of these peripheral devices may be provided as input or output devices for use whether a student or a teacher.

In a single classroom (or in multiple classrooms, as necessary), each student is provided with his or her own student recorder 34 which has attached thereto a respective headset 34a to allow the students to listen to a class lesson and also to provide for the recording of the student answers on cassettes or other recording media (i.e. minidiscs or hard drives if each student unit is provided with a personal computer) inserted in the respective student recorders 34.

Figure 2:
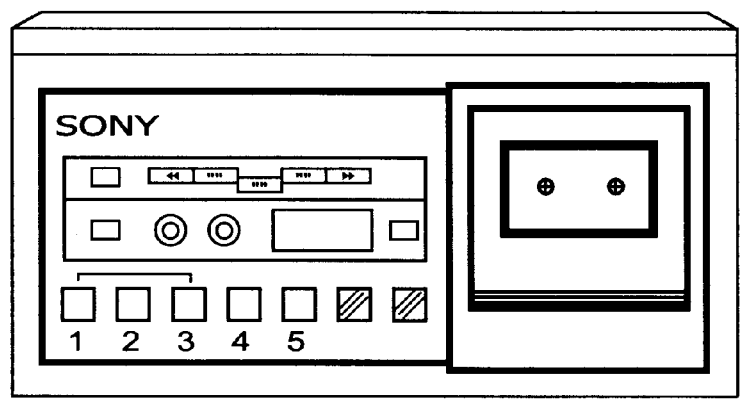
FIG. 2 is an illustration of a master/student recorder.

FIG. 2 is an exemplary recorder that may be utilized as either a master recorder or a student recorder, but it is appreciated that other types of recording/reproducing devices may be utilized by the learning system of the present invention including, but not limited to, a digital audio tape (DAT) recorder, a digital video disk (DVD) recorder and/or reproducing device, etc. Also as is appreciated, the master and student recorders mentioned herein have the standard capabilities of high speed copy/transfer of stored data, independent "program" and "student" volume controls, external audio input/output, A–B repeat functions, go to 0, remote control, and various editing functions.

Figure 3:
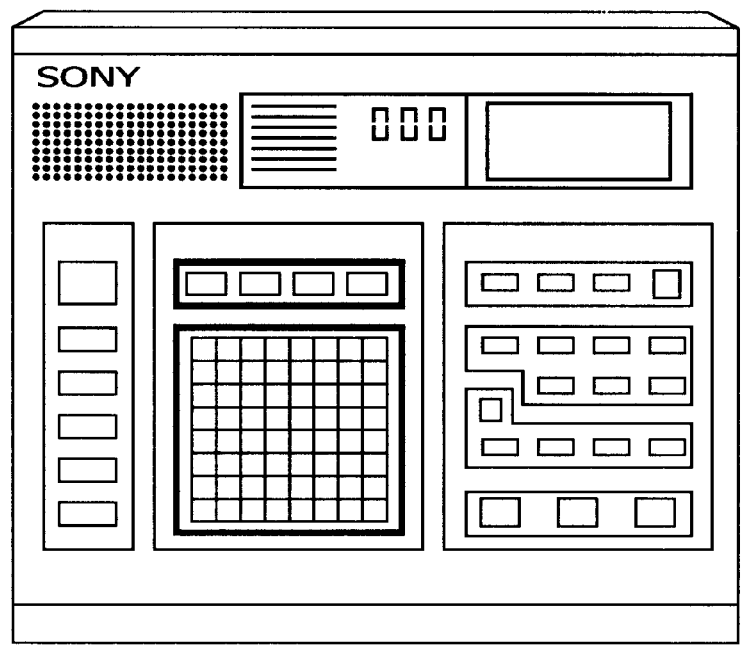
FIG. 3 is an illustration of the teacher control panel shown in FIG. 1.

Teacher unit 30 operates as a control console of the learning system. A display thereof is shown in FIG. 3, wherein, for example, 64 student positions are supported. As will be discussed, teacher unit 30 allows the teacher to carry out various functions including conferencing, student pairing, student\conference modelling, video selection, testing analyzing, pattern storage, as well as various other functions.

Figure 4:
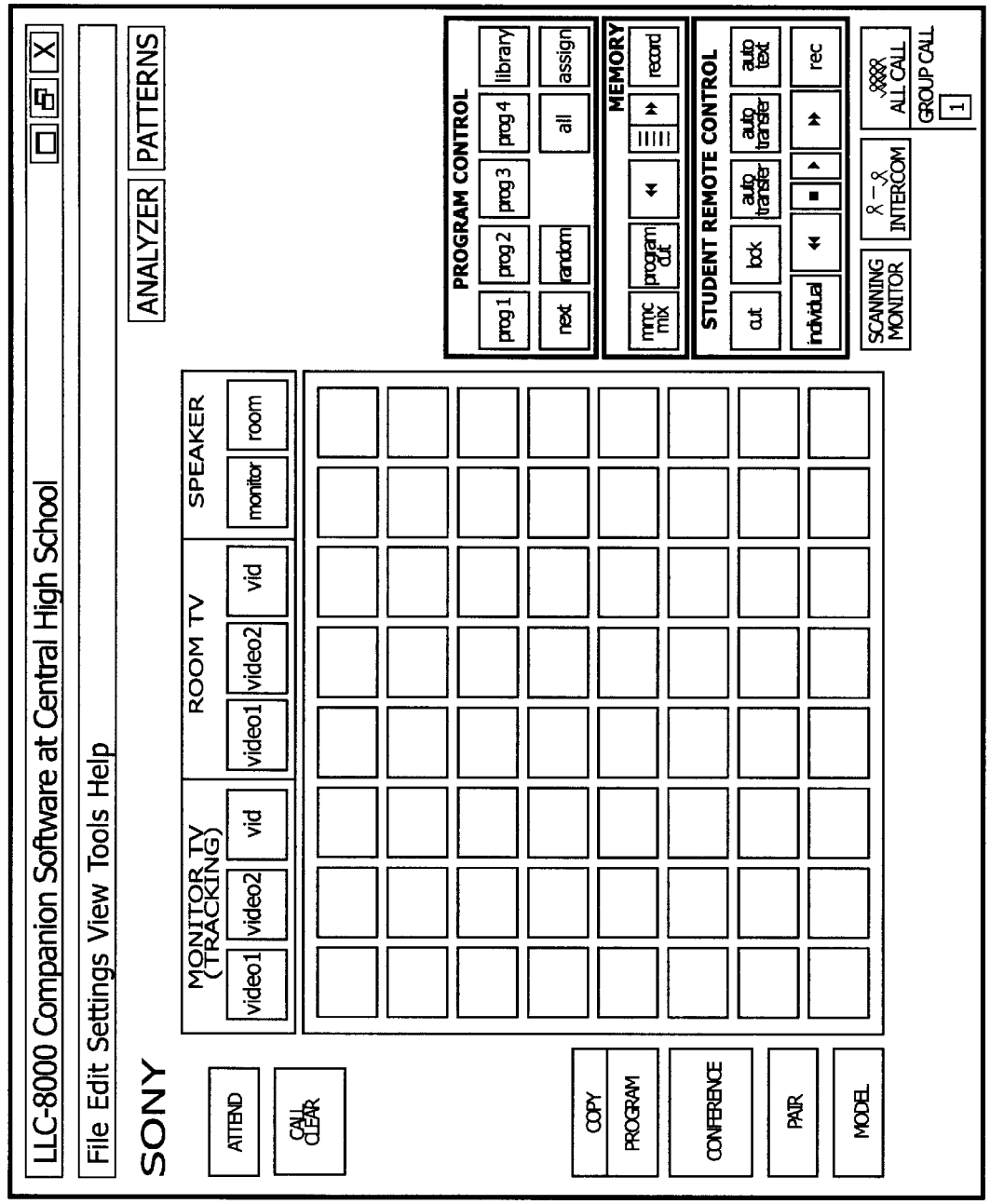
FIG. 4 is an exemplary illustration of the main window of the companion software.

In accordance with the present invention, the teacher, may utilize both the PC and control panel of the teacher unit 30 (FIG. 1) in order to control the system. This PC of teacher unit 30 utilizes learning system software provided in accordance with the present invention. In a preferred embodiment, the learning system software, known as the language learning system companion software (or simply, companion software), provides a graphical user interface (GUI) that is designed to control the learning system disclosed herein. In other words, the companion software is operable, in addition to providing additional features (discussed below), to cause the PC of teacher unit 30 to emulate the control panel of teacher unit 30, wherein the image on the computer's monitor corresponds to the control panel of the teacher unit, such as shown in FIG. 4. Such emulation is important so that users of prior control panels may easily learn and operate the new system of the invention. The personal computer may also be designed to retain various information regarding any of the students using the system. This information may be stored in roster files so that the information is readily available to a teacher using the system. Roster files may, of course, be stored at other locations using known network technology.

In addition to controlling or emulating the control panel of teacher unit 30, the computer is operable to perform numerous other functions including various initialization procedures, including the initialization of the computer system itself as well as the initialization of the language learning system (i.e., the teacher console and the attached devices). During such initialization process, the companion software determines the number of master recorders 32 that are connected to the language learning system, determines the number of student stations (i.e., student recorders 34) that are connected to the language learning system, and determines the location (e.g., within the classroom) of the connected student stations.

Figure 5:
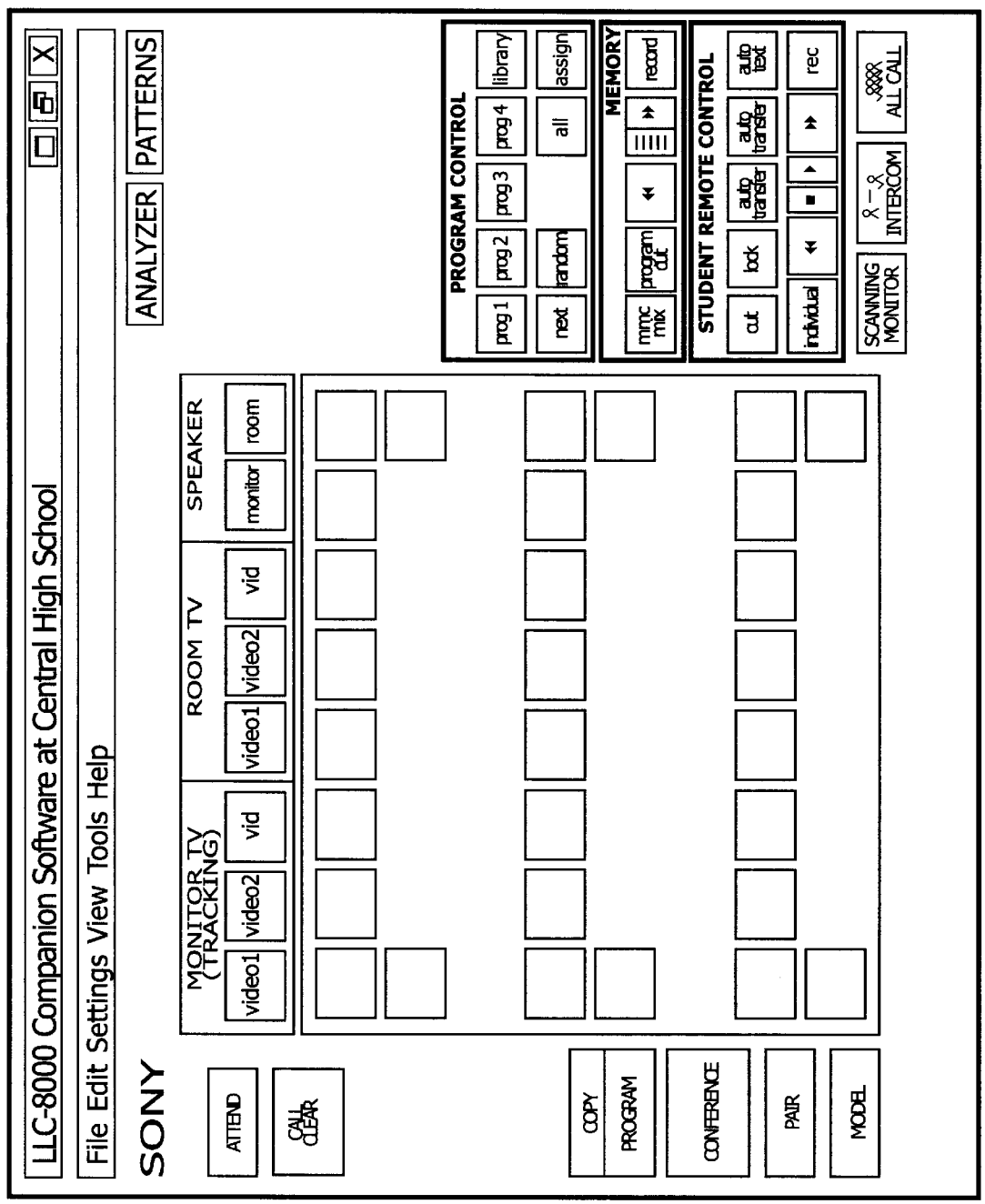
FIG. 5 is an exemplary illustration of the main window of the companion software showing the locations of the student stations that are connected to the language learning system of the present invention.

FIG. 5 is an exemplary illustration of the "main window" display of the computer system of teacher unit 30, wherein it is seen that 30 student stations are detected as being connected to the language learning system and that the positions of those stations are assigned within an 8 by 8 matrix. Of course, other graphical representations of the student stations are possible. In addition, the computer initializes a so-called CA/LL (computer assisted/language learning) switcher, if connected to the learning system, to be further discussed.

Figure 6:
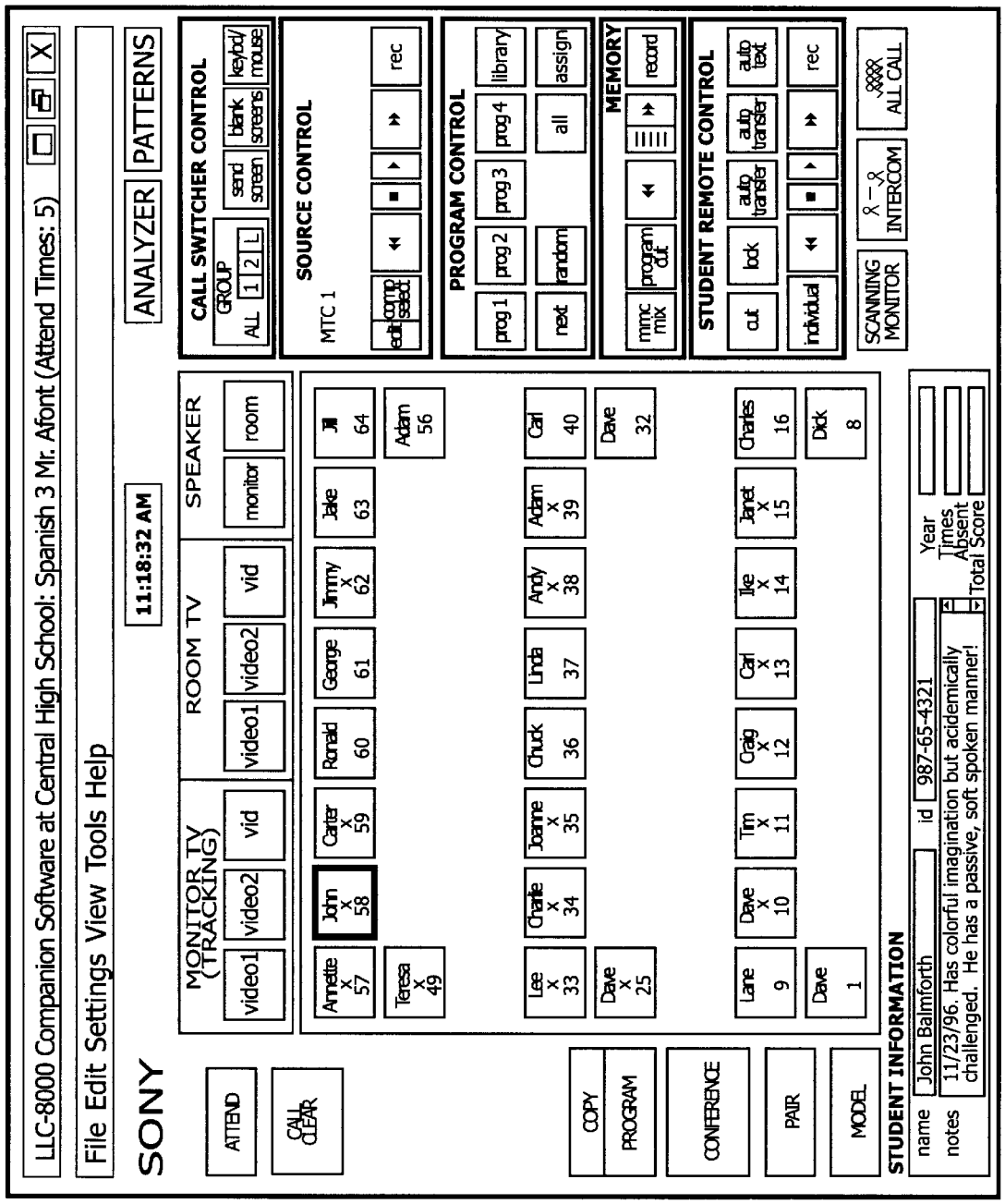
FIG. 6 is an illustration of the main window of the companion software after various initializations.

Referring next to FIG. 6, the main window of the companion software is shown after the various initialization procedures and after the entry of various additional data including the names of each of the students in the class by the teacher or other person or procedure. As previously mentioned, the layout of the companion software display is similar to the control panel of teacher unit 30. However, the companion software main window includes various features and displays that are not shown on the control panel of teacher unit 30, such features and displays generally representing operating status and conditions that are beyond the capability of the control panel 30. For example, program assignments (to be discussed) may be represented by colors or other designators within each student station indicator in the companion software main window, wherein the student stations (in the main window display) of those students assigned to a first group may be displayed in a first color, the stations of those students assigned to a second group may be displayed in a second color, and so on. Similarly, the stations of those students who are in a so-called library mode may be displayed in another color, and students who are determined to be absent may be displayed in yet a different color. Still further, students who are being monitored by the teacher (to be discussed) may be identified, for example, by a colored outline around the corresponding student station indicators in the companion software main window.

In addition to controlling the functions and features of the learning system, the companion software provides the computer of teacher unit 30 with a number of additional functional features, including simultaneous and redundant operation of the control panel of teacher unit 30 and the companion software's main window display, customization of configuration and initialization files, identification of the various audio and video devices that are connected to the learning system, and identification of whether a CA/LL switcher is connected to the learning system and subsequent configuration thereof. In addition, the companion software provides for user entry of various additional information including the institution name, seating assignments (i.e., seat numbers), and various passwords. FIG. 7 illustrates a window of the companion software showing seat numbers of the student stations.

In addition to the above mentioned functions, the learning system of the present invention includes the capability of allowing students to "call" the teacher by means of an appropriate button on the student recorders, and upon selection by the teacher of the calling student, as indicated on the main window display, the student is able to communicate, at least orally, with the teacher. In additional embodiments of the invention, a call by a student may allow for the selection of a group of students by the teacher, or automatic selection of a group of students based upon roster file information, which may all be interested in the conversation. Similarly, the teacher may "call" a student by "selecting" that student in the main window. Still further, the teacher can "call" students assigned to a particular group or call all the students by means of appropriate selections in the companion software's main window display. Finally, the teacher may call all students based upon a query of student information maintained within a particular roster file. Thus, it might be possible for a teacher to call all of the students who failed a particular exam, or who did not yet turn in a particular assignment. Thus, the teacher can converse with students based upon any attribute in the roster files, even if no prior group regarding this attribute has been defined.

In accordance with the present invention, the learning system in conjunction with the companion software also provides the following features:

1. CLASS MANAGEMENT—ROSTER FILES
2. RANDOM PROGRAM ASSIGNMENTS/CONFERENCING/MODEL
3. STUDENT TAPE AUTO COMPILE
4. RESPONSE ANALYZER
5. CA/LL SWITCHER
6. PATTERN FILES

These features of the present invention are discussed in detail below.

1. Class Management—Roster Files

In accordance with the present invention, the companion software includes the capability to allow users (e.g., teachers) to create and edit so-called "roster files", which were briefly discussed above as containing various information about each student. A roster file, as used herein, is a database of information of each of a group of students. A roster file may represent a data base of information for any number of student entities, such as all entities in a class or all students learning a particular subject (e.g., foreign language, math class, science class, etc.) in more than one class or the like. However, by way of example in a preferred embodiment, a roster file pertains to one or more students in a group or class. As will be discussed, some of the information contained in a roster file is displayed continuously in the companion software's main window and other information, e.g., attendance, is not displayed continuously but instead is selectively displayed. A roster file may be stored permanently on, for example, a hard disk or other storage device and subsequently may be retrieved as required (e.g., prior to class time).

Figure 8:
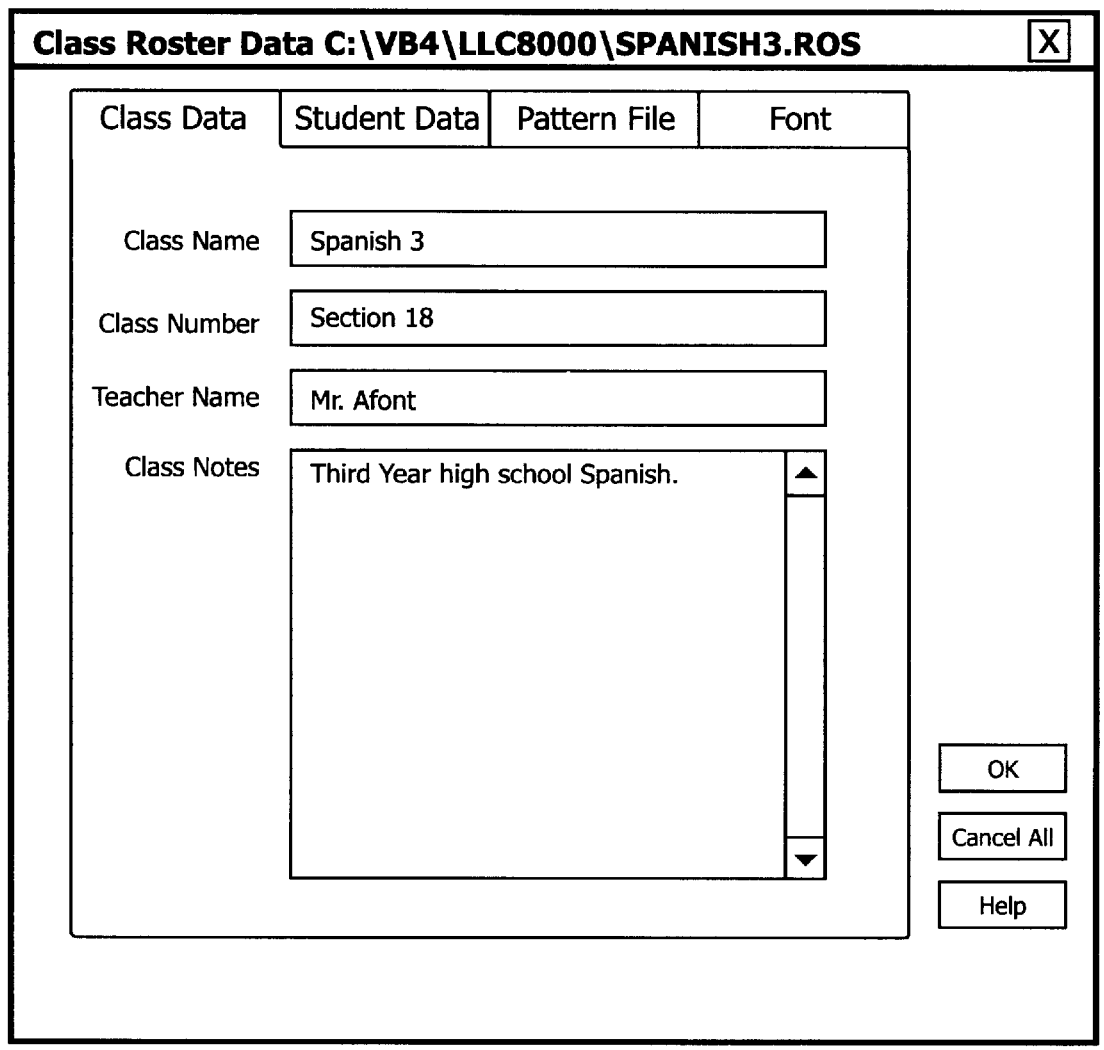
FIG. 8 is an illustration of a window of the companion software showing various class data for a roster file.

When a roster file is created or retrieved through the personal computer of teacher unit 30, various information regarding the roster file is displayed to the user, including, for example, the class name, the class number (e.g., a school identification number), the teacher name, and class notes in a user friendly and easily accessible manner, such as shown in FIG. 8. This information may be changed using the same user friendly display, as necessary. Also, data specific to a selected student may be displayed (also, entered and edited), such as shown in FIG. 9. The student data may include the student's seat number, the student's name, the student's identification number, the student's grade (e.g., grade 11, sophomore, etc.), and teacher notes on the student. Other information such as the number of times the student is absent also may be displayed, and such information generally is updated automatically when attendance is "taken" by the companion software (e.g., by polling the student stations). Still further, so-called "analyzer data" may be displayed. This data refers to the various test information that is collected during automatic testing of the student (discussed below). Finally, any other information may be entered by the user of the teacher unit in order to maintain complete records of each student in a class.

Figure 10:
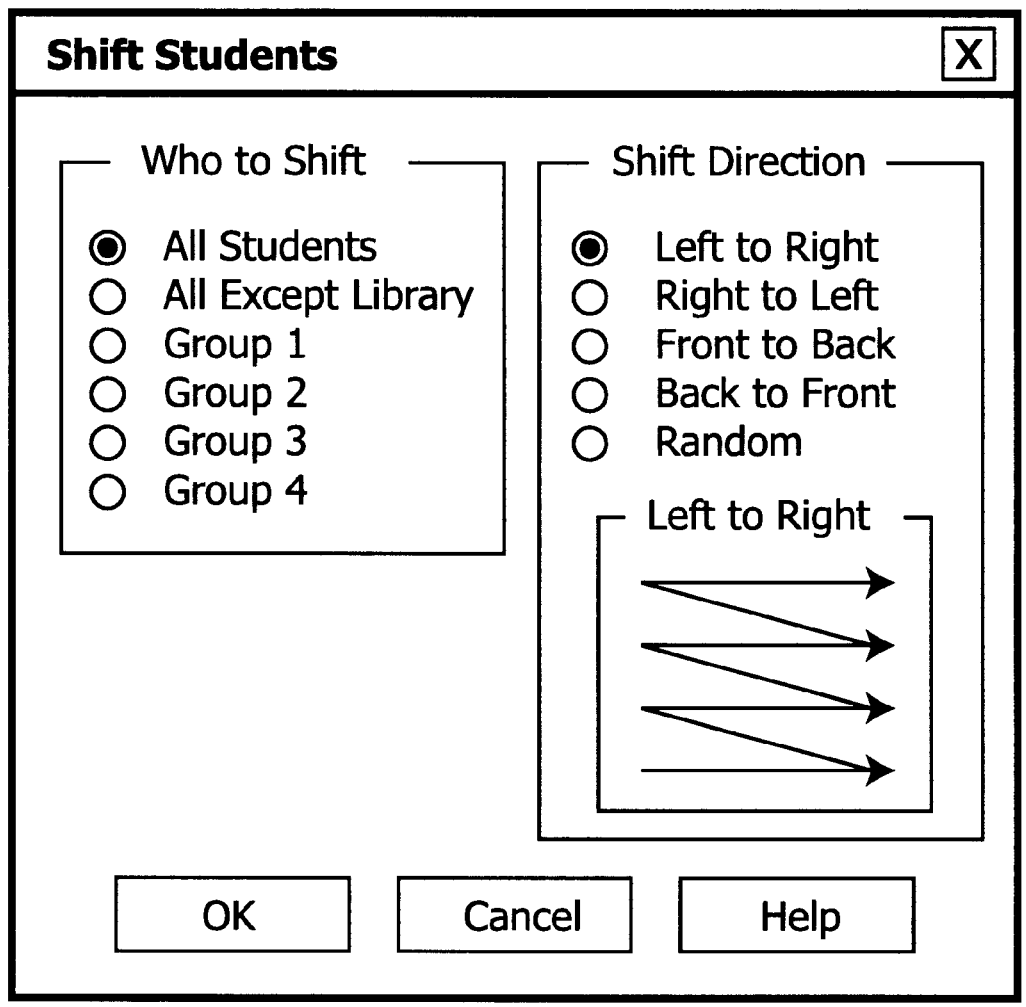
FIG. 10 is an illustration of a window of the companion software that allows for the shifting of student seating assignments.

A class management feature of the companion software uses roster files and further allows the teacher to change student seating assignments without affecting program group assignments (discussed below) or other status/information pertaining to the students. With this feature, a teacher can exchange the positions of two students by "dragging" one student block (as shown, for example, in FIG. 6) onto another student block. Student seating assignments also may be changed by shifting student positions in a selected direction (e.g., left to right). Still further, the teacher may move only selected students (e.g., students assigned to a particular group). FIG. 10 illustrates an exemplary window of the companion software that allows the teacher to shift selected students in a selected direction.

Figure 11:
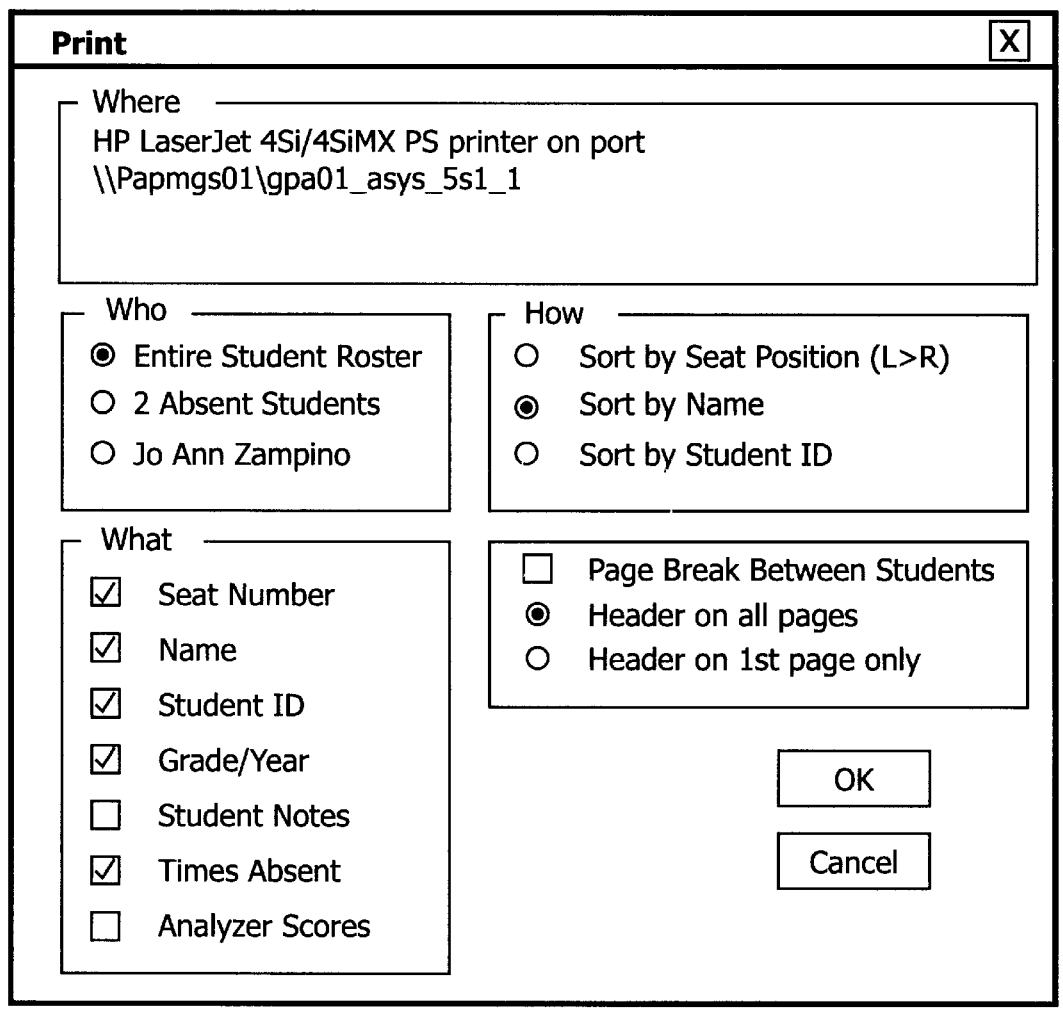
FIG. 11 is an illustration of a window of the companion software that allows for the printing of class roster information.

Class roster information, in addition to being displayed, may be printed via appropriate instructions, wherein the teacher identifies those students to be printed, what information to be printed, and in what order the data is to be printed. FIG. 11 is an illustration of a window of the companion software that allows for the printing of class roster information.

Figure 12:
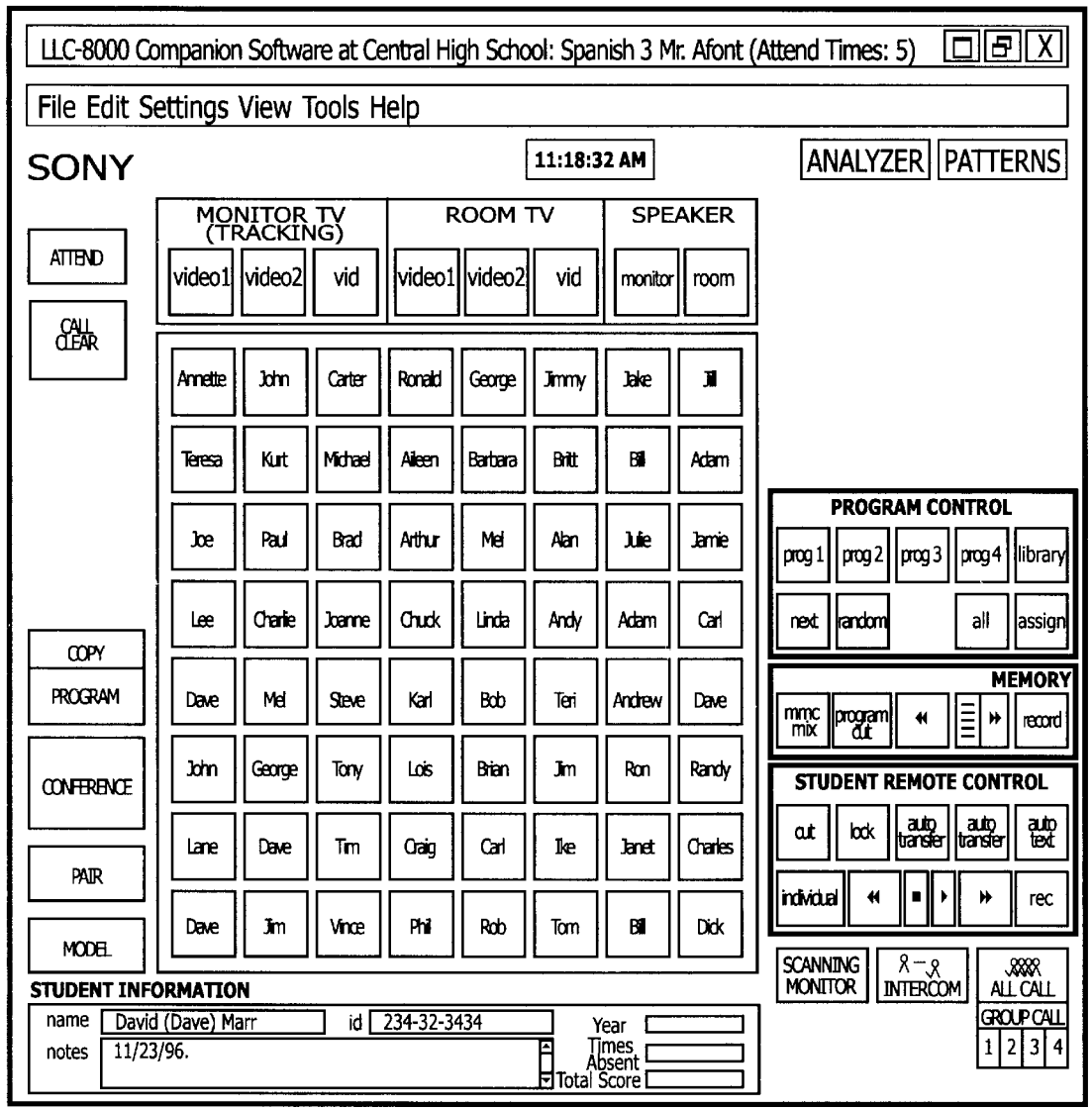
FIG. 12 is an illustration of the main window of the companion software having a student information panel.

Referring next to FIG. 12, the main window of the companion software may include a so-called "student information panel" which provides textual information about a student being monitored. The textual information may include the student's name, the student's identification number, the student's school year, student attendance information, the student's average score, and teacher notes on that student. Of course, other information pertaining to the student may also be displayed. As previously mentioned, attendance is automatically taken, for example, by polling each student station at the beginning, middle or end of a class, and the student's absence information thereafter is updated automatically. In addition, when a student is considered to be absent, communication with that student's station is terminated. Also, absent students are identified in the main window, for example, by displaying the corresponding student block in a light gray color.

Class management using roster files in accordance with the present invention further provides the feature of "group assignments", wherein non-absent students may be assigned to any one of four (or more) program groups and library mode. As previously mentioned with reference to FIG. 1, a multiple number of (e.g., four) master recorders 32 may be connected to the learning system of the present invention, and during the previously mentioned initialization of the equipment, one of the master recorders is designated for "program group" 1 students, another master recorder is designated for "program group" 2 students, etc. During class, and in accordance with the present invention, the teacher, by means of the companion software's main window, identifies those students to be assigned to group 1, identifies those students to be assigned to group 2, and so on. Alternatively, the students may be automatically assigned to a particular group based upon the status of any particular attribute stored in the roster file, such as which assignment has been previously completed by a particular student or the student's success on various prior assignments, by way of example. Thereafter, students assigned to group 1 hear the audio reproduction of the first master recorder, students assigned to group 2 hear the audio reproduction of the second master recorder, etc. As previously mentioned, and with reference to FIG. 6, student group assignments may be identified by the respective color of the respective student blocks, or other indicator, in the main window.

Figure 13:
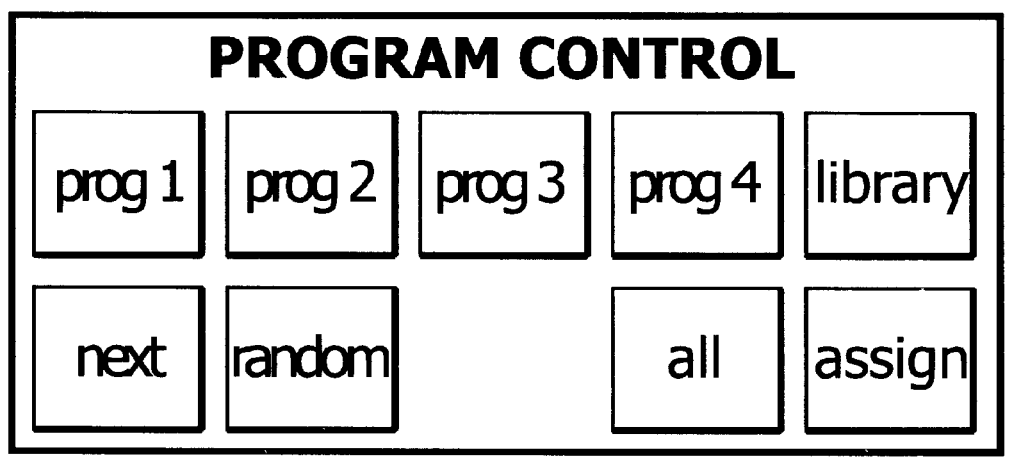
FIG. 13 is an illustration of a program control panel that is included in the main window of the companion software.

Group assignment is achieved by selecting an appropriate program selection box in a program control panel, as shown in FIG. 13, that is included in the main window of the companion software, and then selecting those students either manually or automatically in accordance with roster file information (i.e., the corresponding student blocks in the main window) to be assigned to the selected program. In addition, other group assignment functions include assigning all students to a single program group (e.g., by selecting "ALL" in the program control panel), assigning students randomly to a program group, and assigning students to the next available group, that is, assigning students previously assigned to group 1 to group 2, assigning students previously assigned to group 2 to group 3, etc. Students assigned to library mode are unaffected. In addition, the teacher may allow each student to choose the program group to which he or she will be assigned.

Class management further is carried out by means of the companion software's capability of easily allowing the teacher to perform a "group call", wherein the teacher is able to communicate with the students assigned to a selected program group(s). In this instance, the teacher selects one or more of the group call numbers in the group call panel included in the companion software's main window, as shown in FIG. 14 Thereafter, the companion software selects the corresponding program source(s), supplies the teacher's voice to each of the selected students via their respective student stations, and optionally either prevents or permits transmission to the teacher of the selected students' voices. In addition, the companion software optionally may pause the particular master recorder(s) 32 corresponding to the selected group(s) during the group call so that portions of the tape for a particular group will not be played while the teacher is speaking with the students assigned to the group.

Figure 15:
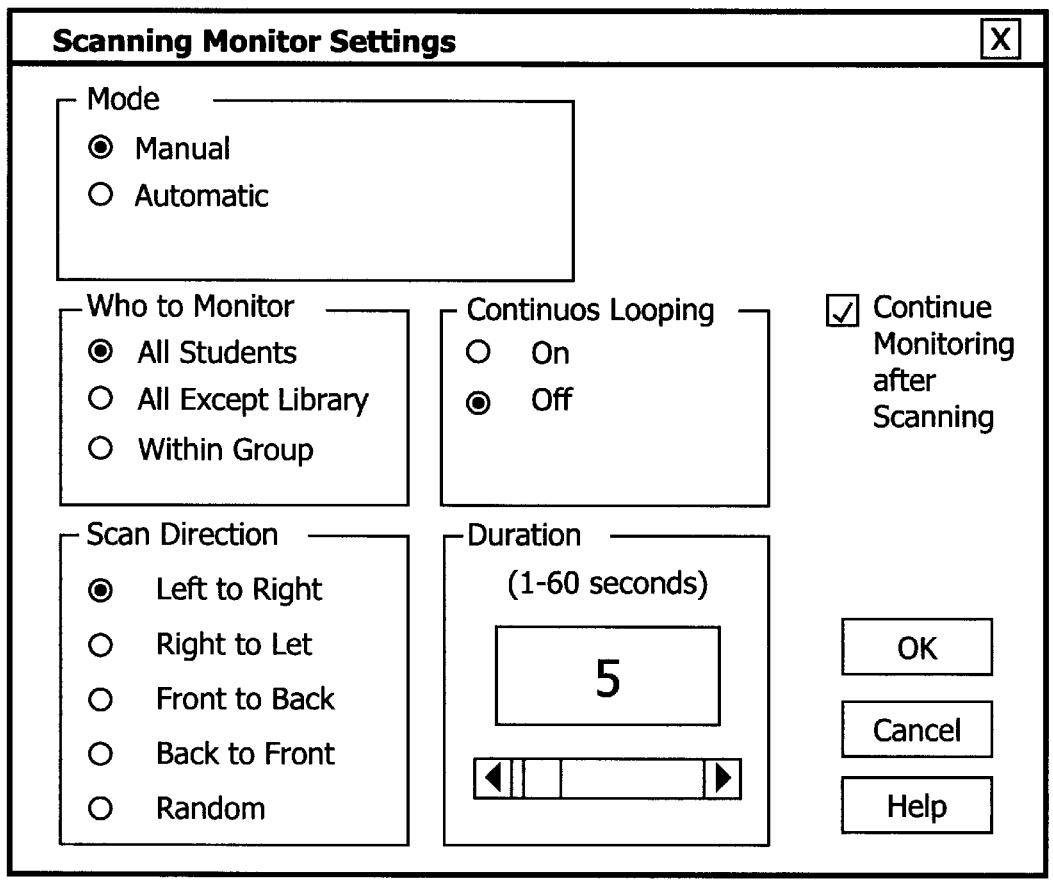
FIG. 15 is an illustration of a window of the companion software that provides for student monitoring.

As previously mentioned, students may be monitored by the teacher using the companion software. FIG. 15 is an exemplary window of the companion software that allows the teacher to set up a so-called scanning monitor function. A manual scanning monitor mode is available, during which the next student to be monitored is monitored in response to a request by the teacher. During an automatic scanning monitor mode, however, selected students are monitored automatically and sequentially for a pre-set period of time. Once a student has been monitored, he or she need not be monitored again until all students in a group have been monitored. In this mode, the teacher may identify which students (e.g., all students, students assigned to a particular group, students fitting a particular query regarding information in the roster file, etc.) to monitor, the scanning direction, the duration of time to monitor each student, whether monitoring may be "paused", etc. In accordance with the present invention, those students designated to be monitored are identified in the companion software's main window. Referring back to FIG. 6, student blocks containing an "x" have already been monitored. Of course, additional characters and representations may be provided to identify those students previously monitored, that student currently being monitored, and those students who are to be monitored.

The learning system/companion software further provides the function of displaying (e.g., within the main window) the tape transport status of all connected student units. Such information may be selectively displayed or continuously displayed. FIG. 16 illustrates exemplary data to be included within the student blocks in the main window, wherein, as shown, an "S" indicates that the student's tape recorder 34 is in stop mode, the character ">" represents the play mode, the characters ">>" represent the fast forward mode, the characters "<<" represent the rewind mode, the characters "NT" indicates that no tape is in the student deck, "EOT" indicates that the tape is at its beginning or end, "2×>" represents that the two times reproduction mode, "REC" represents the recording mode, "2×R" represents a double speed recording mode, "DRL" represents drill recording, "RP" indicates the tape in the student recorder is record protected, and "AA" indicates an audio active panel.

2. Random Program Assignment/Conferencing/Model

Another feature of the companion software in accordance with the present invention is the functions of providing random program or group assignments, random conferencing and random modelling. As previously discussed with reference to FIG. 13, the teacher may individually assign students to different program groups, or in an alternative embodiment, may assign students to groups based on certain conditions regarding the retained data of each of the students. In addition, the teacher may randomly assign each or selected students to an available program group by means of an appropriate instruction (e.g., selecting the "RANDOM" block in the program control panel of the main window). Upon random selection, the companion software randomly assigns those students who are both present and not in the library mode to any one of the program groups that are available (i.e., to any one of the master recorders 32). Thus, if four master recorders are connected to the learning system, then each student (present and not in library mode) is assigned to either the first recorder, the second recorder, the third recorder or the fourth recorder. Still further, and although not schematically shown in the drawings, the students may be randomly selected so that only particular students are assigned to particular program groups. After being assigned to one of the groups, the representation of each student on the computer is altered to indicate the group to which each particular student belongs, thus allowing the teacher immediate control over the further functioning of each of the students or groups and knowledge regarding the constitution of each of the groups.

As an alternative or in addition to random group assignment, the teacher may randomly change the seating assignments of the entire class or of a selected group of students. For example, the window shown in FIG. 10 includes a random shift direction option which provides for the random shifting of the student seating assignments. Of course, not only may the seating assignment be randomly shifted, but also randomly moved in other manners, such as the random swapping of pairs of student seating assignments. Any changes in student seating will be indicated by a change in position As previously discussed, current systems provide hardware for the establishment of a conference, wherein students within that conference are able to communicate with one another. However, in a particular embodiment, the present invention allows for the establishment of multiple conferences, all setup in software, wherein students within each conference are able to communicate only with students within the respective conference. The teacher may monitor any of the particular conferences by choice, or may monitor any number of the conferences in an automatic switching manner, as noted above.

Figure 17:
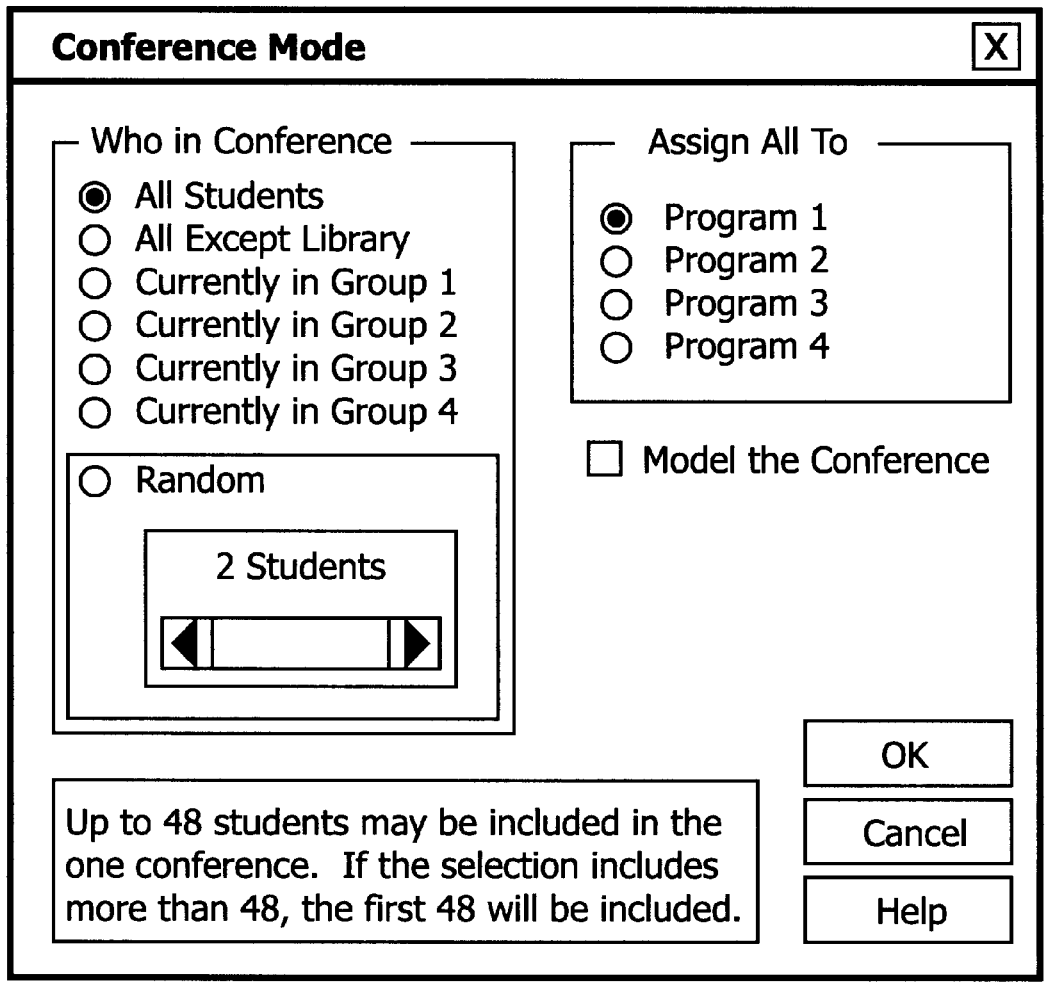
FIG. 17 is an illustration of a window of the companion software that provides for establishing a conference.

Further, a conference may be established by selecting a collection of students to be included therein, or in an alternative embodiment by setting certain criteria for automatic selection of students to a particular conference, aside from the manual assignment of students to a conference. For example, the window shown in FIG. 17 allows for the selection of students that are assigned to one or more groups to be assigned to a conference. For example, the teacher may select those students assigned to group 2 or group 3 to be included in the same conference, whereupon all of the students assigned to either of these groups are able to communicate with one another. It is also possible to assign students to a particular conference based upon roster file criteria. Thus, all students meeting a certain criteria may be assigned to a certain conference. This criteria may be as simple as all students who have not yet completed a certain lesson, received a certain score on a test, or any other criteria.

In addition, and in accordance with the invention, the teacher may have the companion software randomly select those students to be included in one or more conferences, and optionally may select the number of students to be included in each of those conferences. For example, the companion software may randomly select both the number of students and the particular students to be included in a particular conference, or the companion software may randomly select up to a designated number of students to be included in a conference.

Still further, multiple conferences may be established, as mentioned above, with the additional possibility that the teacher selects those students to be included in one conference and the computer randomly selects those students to be included in another conference, or any combination thereof. For example, the companion software may randomly select, e.g., 10 students to be included in a first conference, randomly select 15 students (who are not assigned to the first conference) to be included in a second conference, and randomly selects 10 students (who are not assigned to either the first conference or the second conference) to be included in a third conference, etc. Thus, if 60 students are present, and the teacher wants to establish conferences made up of, for example, only four students, then the companion software may be set to randomly set up 15 conferences, each including only four students.

In addition to establishing conferences, so-called "random pairing" may be achieved by the companion software, wherein students are randomly paired to each other by the companion software. Here, each student is able to communicate only with that person to which he or she is paired. For example, if there are 20 students in a class, random pairing causes 10 two-person conferences to be created.

Referring once again to FIG. 17, one option relating to conference mode is "model the conference", wherein the companion software automatically "models" that conference allowing all students to hear the members of that conference. That is, all of the students that are not in the conference are able to hear the conference (i.e., all of the students included in the conference). In addition to modelling a conference, the companion software allows the teacher to model any one particular student or, similarly, any pair of students that have been paired together, for example, during random pairing. Still further, one of the established conferences may be randomly selected as the model conference by the companion software and, similarly, a student or a pair of students also may be randomly selected to be modelled. Furthermore, the graphical display on the computer indicates which students are acting as the models, and which other students are listening to the model by changing the graphical representation of each of the students involved.

3. Student Tape Auto Compile

A further feature of the learning system\companion software of the present invention is the companion software's ability to assist the teacher in automating the process of retrieving audio recordings made on each of the student stations (i.e., student recorders 34) and compiling those audio recordings into a selected format onto one or more cassette tapes in master recorder(s) 32. Similarly, if the student recordings are stored on other devices, they may be accessed in a similar manner. Thus various digital storage media, such as hard drives or even non-volatile or volatile memory may be employed as a storage device, by way of example.

Figure 18:
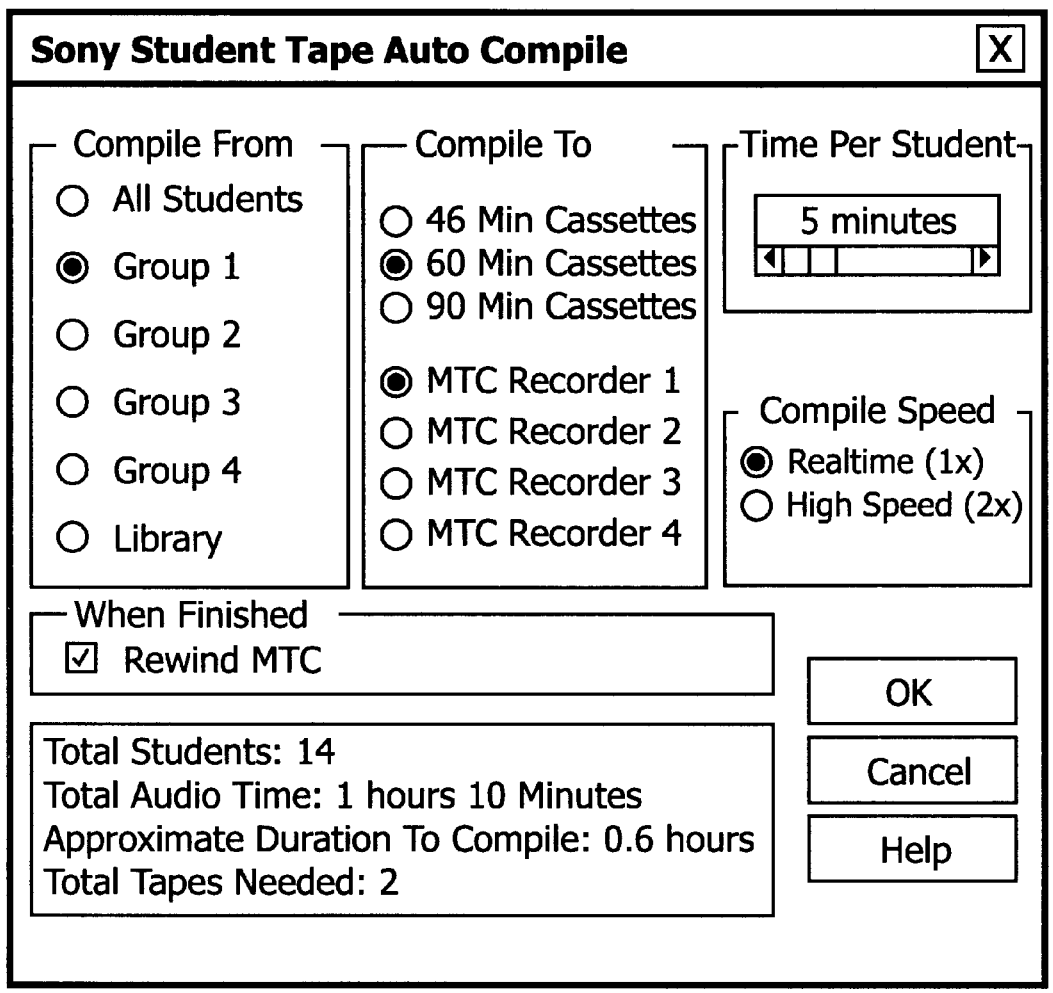
FIG. 18 is an illustration of a window of the companion software for performing the student tape auto compile function of the present invention.

FIG. 18 is an exemplary window of the companion software for performing the student tape auto compile function of the present invention. As shown, the teacher may choose to compile audio recordings from all student stations, from student stations assigned to any of the four program groups, or from student stations assigned to library mode. Also as shown, the teacher may indicate the lengths of the cassette tapes on which the audio recordings are being recorded in the master recorder(s), as well as which master recorder(s) is to be used to record the compiled information. The teacher further may identify the amount of recording time of each selected student that is to be compiled and the particular recording speed by the master recorder during such compiling. Other miscellaneous functions also may be specified including whether the cassette tape in the master recorder(s) is to be rewound after compilation is completed, whether the companion software is to print out a listing of students whose recordings were copied, and whether the student tapes are to be rewound after the compilation process. Also as shown, the companion software displays various information to the teacher, including the total number of students that have been selected for compilation, the total student recording time (which generally is a function of the time per student selection), the amount of time needed to compile the audio recordings, and the number of cassette tapes that are required for such compilation. As is shown, the required recording time is less than the total playback time of the student answers. This is because the audio may be stored at the master unit in a compressed format and may be transferred at a faster than normal playback rate.

Although not shown in FIG. 18, the companion software further allows the teacher to specify the particular recording format of compilation. For example, the teacher may specify that the student recordings are compiled sequentially onto the "master" cassette tapes in the master tape recorder(s), wherein the entire recording or a selected amount of time of the recording of the first selected student is recorded (i.e., copied), then the recording of the second selected student is copied, and so on. Student order may be selected by the teacher, may correspond to the student seating assignment, or may be determined based on other criteria, for example, previous test results of the students, student grade level, or any information which may be maintained on a roster files, etc. Another possible recording format is to record student recordings by question order, wherein the first answer of all selected students are copied onto the master cassette tape, and then the second answer of those students are copied, and so on. Here, the question order may be sequential (i.e., question order number 1, 2, 3, etc.), or may be selected by the teacher. In this instance, the student recorders are controlled to fast forward or rewind to the beginning of the appropriate answer by means of the recording of data "marks" or signals on the student cassettes at the beginning and/or end of each student answer, thus facilitating the locating of a particular answer on the students' cassette tapes. Similar codes may be stored on the master tape to allow for access to a particular student's answers or any other piece of data which has been properly marked. Thus, playback need not take place in a purely serial manner.

By using the student tape auto compile function of the present invention, the teacher is able to automatically record student answers onto master tape cassettes for any desired purpose. For example, to allow the teacher to "take home" the students answers for grading purposes. Also, particular government sponsored exams require that student answers be recorded in a particular format. Furthermore, it is possible to provide appropriate output means so that recorded information may be transmitted in a digital format over a network or the internet to an appropriate location for grading, review or offsite storage. Thus, the learning system of the present invention provides for the quick, easy and automatic process of providing student recordings in the required format.

4. Response Analyzer

Another feature of the learning system of the present invention is the companion software's so-called "response analyzer" function which provides for the automatic testing of students. The response analyzer function assists the teacher in the test taking process or automatically controls the test taking process in accordance with the teacher's requirements. Such assistance/control may be provided for a single test question, selected test questions, a sequence of test questions, or the entire test (i.e., all of the test questions).

Figure 19:
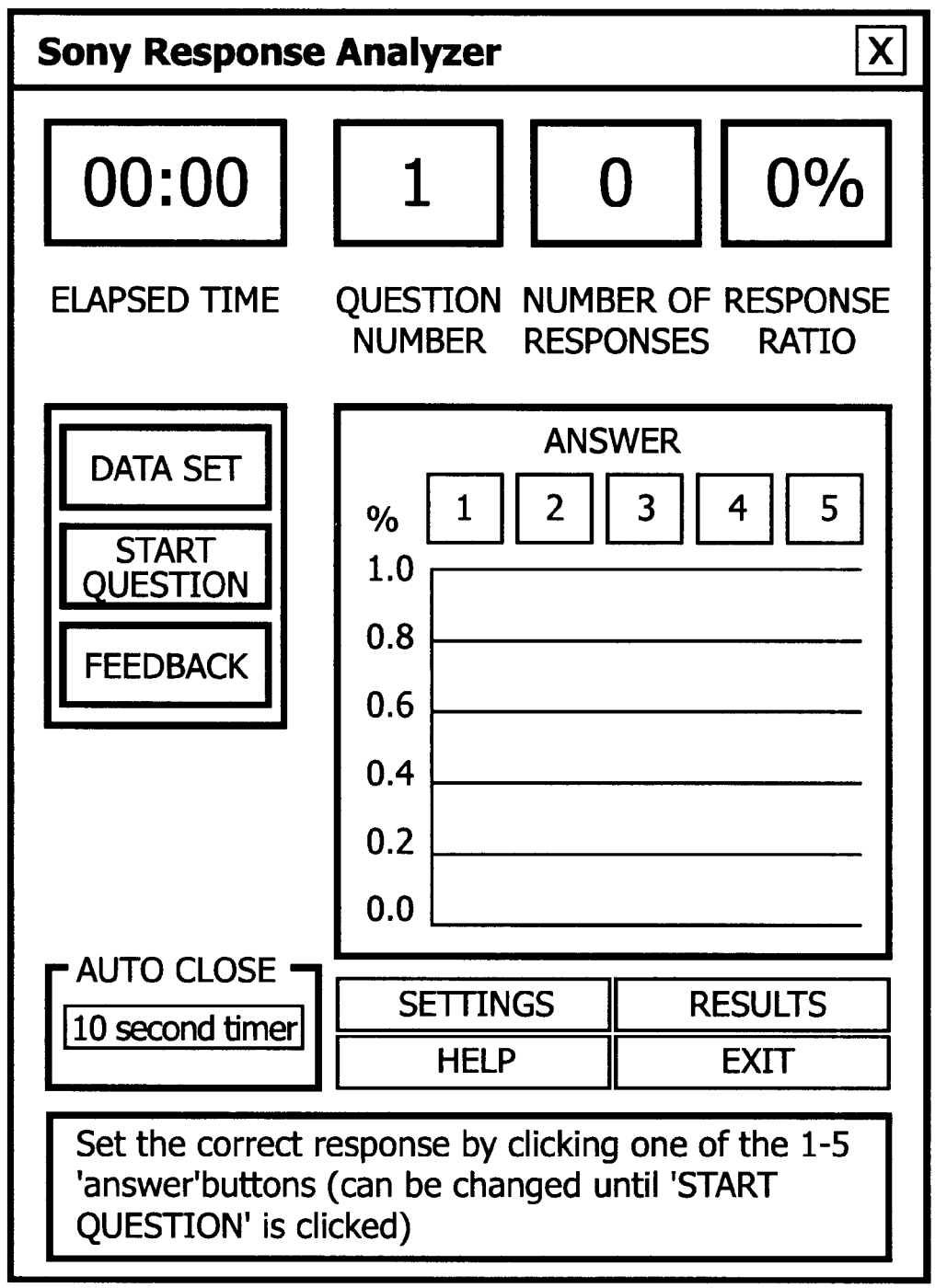
FIG. 19 is an illustration of an exemplary response analyzer window of the companion software relating to the response analyzer function of the present invention.

FIG. 19 is an exemplary response analyzer window of the companion software for use by the teacher during or prior to student testing. To initiate a new question (e.g., during student testing), the teacher selects "START QUESTION" in the response analyzer window. Thereafter, the selection "START QUESTION" changes to "CLOSE QUESTION" to allow the teacher to manually "close" (i.e., terminate) the question. Alternatively, a separate "CLOSE QUESTION" selection block may be included along with the "START QUESTION" selection block.

During testing, the companion software provides to the teacher various useful information including the amount of time that has elapsed since the start of the current question, the question number (which generally increments each time the teacher starts a new question), the number of students who have responded to the current question, and the ratio of the number of students who have responded to the current question to the total number of non-absent students (response ratio). These values are updated continuously. The response analyzer window further displays the "correct" answer for the current question as programmed by the teacher (e.g., the correct answer is identified by a different color). Also as shown, the response analyzer function provides a bar graph display with five columns, each column corresponding to a different possible answer, and after the initiation of a question, the percentage of students selecting the respective response is shown in the bar graph. Of course, other types of graphs may be provided.

Figure 20:
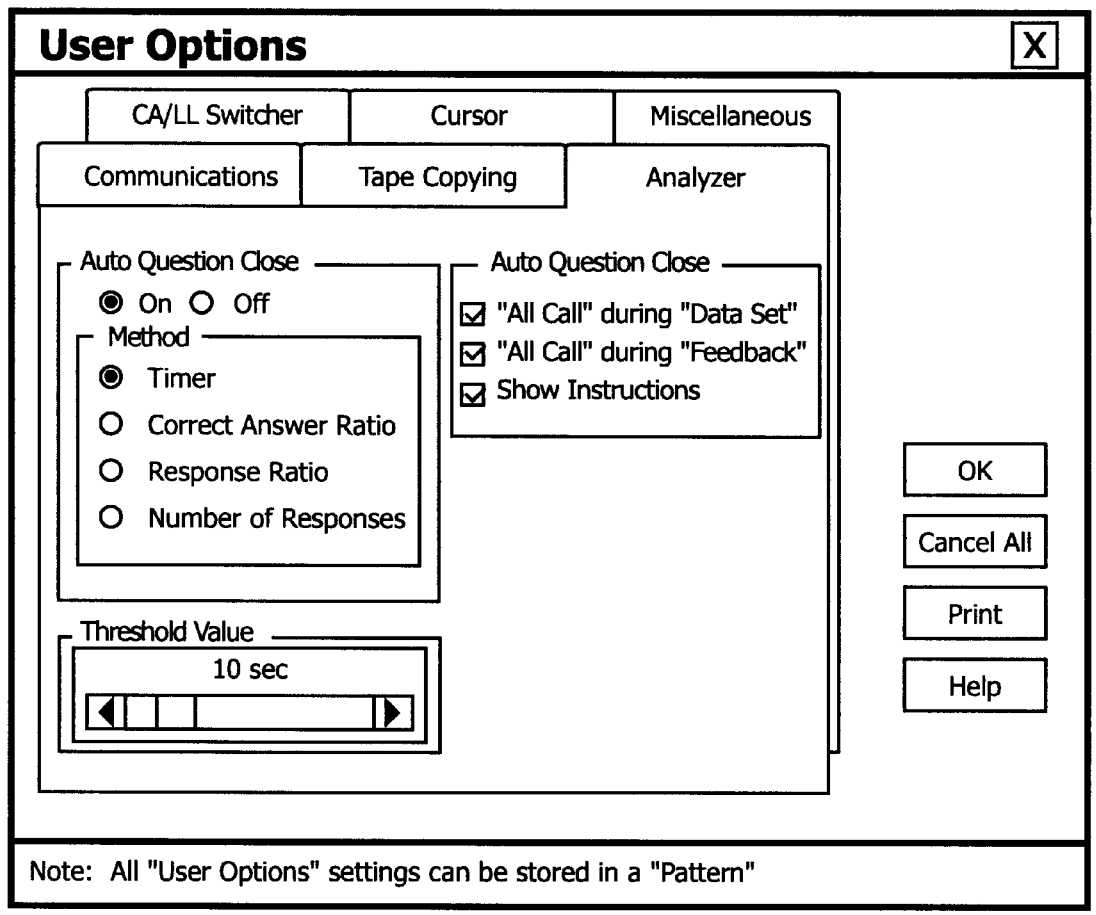
FIG. 20 is an illustration of an exemplary response analyzer window for setting the response analyzer's automatic functions in accordance with the present invention.

The companion software's response analyzer function further includes an auto-question-close function in which the teacher is able to pre-program the response analyzer to "close" a test question after selected criteria are satisfied. Referring to the exemplary window shown in FIG. 20, the teacher may indicate a particular question, or questions, or all of the questions, to automatically close based on the following selectable parameters. The teacher may select the time method wherein the companion software closes the question after the selected amount of time has passed. The teacher may select the correct answer ratio method wherein the companion software closes the question after the selected percentage of students have answered the question correctly. The teacher may select the response ratio method wherein the companion software closes the question after the selected percentage of students have responded to the question. And the teacher may select the number of responses method, wherein the companion software closes the question after the selected number of students have responded to the question. For ease of use, the threshold value in the window shown in FIG. 20 represents that number or percentage utilized by the selected method. In addition, the teacher may select a combination of methods to allow for further flexibility in the testing procedure. For example, both the timer method and the correct answer ratio method may be selected, wherein the question is closed automatically after the selected amount of time has passed or after the selected percentage of students have answered the question correctly, whichever is sooner (or, alternatively, later). Of course, various methods and/or combinations of methods may be utilized depending on the particular type of test and needs of the teacher.

The analyzer features shown in FIG. 20 further include other automatic functions including a so-called "'all call' during 'data set'" function which enables the teacher to communicate with the students, for example, to allow the teacher to recite the question and possible answers prior to allowing the students to select their responses. Another feature "'all call' during 'feedback'" enables the teacher to verbally inform the students of the correct answer and explain the results of the responses to the question. The function "show instructions" provides instructions to the teacher.

As previously mentioned, the response analyzer function may be used to assist the teacher for a particular question, selected questions or all of the questions given in a test. Generally, the teacher may choose to use the same method of automatically closing a question for all of the questions in a test. However, the teacher may select different "auto close question" methods for different questions within the same test for further flexibility in the testing process. Thus, each question may be given in a customized manner, as needed.

In accordance with the present invention, the teacher may prepare questions and answers in advance and have the companion software perform that test automatically. The test may be in the form of written questions or oral questions, wherein the oral questions are provided by the teacher during testing or, alternatively, are provided by one of the master recorders reproducing a cassette tape having questions previously recorded thereon. The teacher may further identify the possible answers, again either in written form or orally, and identify to the companion software the correct answer for each question. The teacher optionally may pre-program the companion software to automatically close selected or all questions using one or more auto-question-close method. Thereafter, the response analyzer function of the present invention is operable to automatically test the students in accordance with the teacher's desires.

Other programmable options include, and as previously mentioned, allowing the teacher to provide feedback to the students after and/or before each question, and feedback to the teacher of certain statistical information pertaining to the current question (e.g., percentage correct, etc.). The companion software further can identify each student's selected answer in the respective student block in the main window of the companion software. For example, A, B, C, D or E is displayed in the student block depending on the student's answer (as entered on the respective student station), and a question mark is displayed if the student has not yet responded to the current question.

The response analyzer function further provides the teacher with a comprehensive, detailed analysis of the student responses which then can be printed and/or saved in a file. The detailed analysis of the student responses is provided by a so-called "analyzer results" dialogue which is shown in FIG. 21. As shown, the "STUDENT RESULTS" portion of the dialogue displays two grids, a first grid which shows the scores of each of the students, and a second grid which illustrates detailed information (e.g., the student's responses for each of the questions, as well as the correct answers) for the student highlighted in the first grid. The dialogue also includes a "CLASS SUMMARY" which identifies the correct answer, the response ratio and the correct response ratio of each of the questions, as well as the class average. All of the data provided in the analyzer results dialogue, in addition to the particular questions and answers of the test (if provided), may be stored in memory or in a file in a storage device. This data also may be printed.

The response analyzer function of the present invention further includes the capability to automatically (or manually) update the student scores in the roster file. When updating the roster file, the teacher optionally may designate a test weight factor (e.g., between 1 and 10) for the current test and, then, each student score, along with the test weight factor, is added to the roster file for that class. In addition, a question weight factor for each individual question within the test may be set, if desired, and the question weight factors also are stored in the roster file. Generally, the test weight factor determines the number of times a test and the corresponding student score is counted in the average. If question weight factors are provided, then the student score reflects the particular question weight factors of the questions in that test. Of course, other weighting factors also may be utilized.

Figure 22:
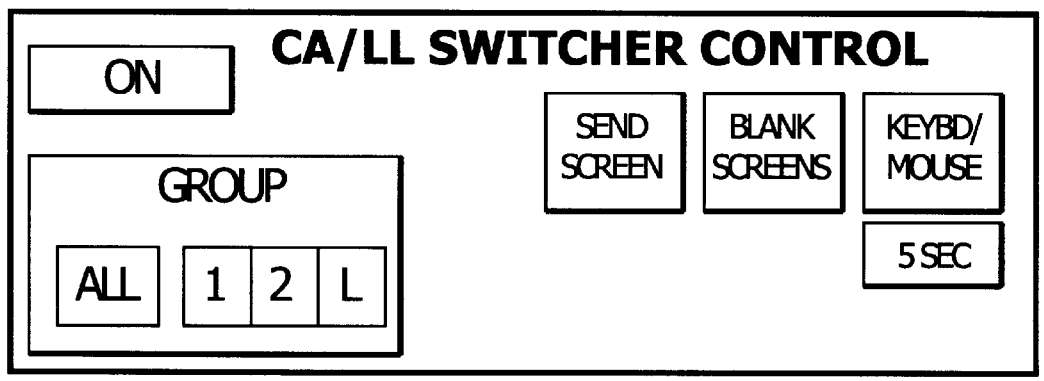
FIG. 22 is an illustration of an exemplary CA/LL Switcher Panel that controls the operation of the switching system.

5. Synchronized Control of Language Learning System Hardware and Personal Computer RGB/Mouse Computer-Switching Network The companion software includes the feature of controlling an RGB/Mouse Computer-Switching System (i.e., the CA\LL switcher) that is compatible with the language learning system through, for example, an RS-232 serial communications port on the computer of teacher unit 30 running the companion software. The CA/LL switcher is an existing switching device that switches video sources and control signals between various devices (e.g., the student computers and the teacher's computer). A CA/LL Switcher panel, such as shown in FIG. 22, controls the overall operation of the switching system and provides the following functions. The CA/LL switcher may be placed in either an on mode or a standby mode, all or selected student stations (e.g., student stations assigned to a particular group) may be included in CA\LL switching (to be discussed), and personal computers that optionally are attached to the selected student stations may be controlled by the teacher's computer (running the companion software).

The synchronized control feature of the present invention allows the teacher to cause the video display on the teacher's computer to be sent to all selected student computer screens, wherein each student station has a respective personal computer attached thereto. When the "SEND SCREEN" function is selected by the teacher, the companion software main window may be automatically minimized so as to not display that window on the student computer screens, and when the teacher turns "SEND SCREEN" off, the companion software main window may automatically be maximized so that the teacher can resume operation of the companion software. The teacher also may cause selected student computer screens to blank, if necessary. Finally, the teacher may control the keyboard and mouse of a particular student being monitored. Upon selection of "KEYBOARD/MOUSE", the computer screen of the student being monitored is switched to the teacher's monitor and, thereafter, the teacher is able to control that student's computer keyboard and mouse to perform any necessary operations. For example, it may be necessary for a teacher to "take over" a student's computer to expedite some operation, or a student may be operating his or her own computer in an improper manner thus requiring teacher action.

The above-discussed keyboard/mouse function of the present invention causes the teacher's computer to control one of the student's computer. Such control may be accomplished by means of a second teacher's computer, wherein that second computer controls the student's computer and the teacher's "first" computer is used to execute the companion software of the present invention. However, if the teacher's computer is utilized to run the companion software and also is utilized as the "source PC" for the CA/LL switcher, then activation of the keyboard/mouse function causes the teacher's computer to physically disconnect from its own screen, keyboard and mouse. When this happens, the companion software is unable to receive input from the teacher and, in order to prevent the teacher's computer from being "locked up", the companion software utilizes the following methods to return control of the teacher's computer to the teacher. First, a countdown timer method may be utilized, wherein the CA/LL switcher window includes a countdown timer which is automatically activated when the teachers selects the keyboard/mouse function. The countdown timer is set to any amount of time, for example, one second, five seconds, ten seconds, thirty seconds, etc. Another method is to cause interruption by means of the depression of one of the buttons, for example, the "call clear" button on teacher console 30. Of course, other methods may be used.

Moreover, and although not shown in FIG. 22, the source computer (i.e., the teacher's computer) optionally may "listen" and/or "see" the audio/video that is heard and seen by the selected student. Thus, the teacher is able to monitor not only the status of a selected student, as previously discussed, but also the video and audio information that is being seen and heard by that student.

6. Pattern Files

The companion software of the present invention further allows teachers to create so-called "pattern files" which contain data regarding the status and settings of the learning system, as well as information that is specific to the companion software settings. A pattern file may store a number of different "patterns", and after the selection of a stored pattern, the data in the selected pattern is used to set up both the learning system (control panel) and the companion software. A pattern may be created and then stored, and subsequently may be reproduced to setup the system. Each pattern includes various data relating to the learning system including the program group assignments for the students, monitor television settings, room television settings, speaker settings, program number settings, Mic mix settings, program cut settings, Mic cut settings, lid lock settings, auto transfer x1, auto transfer x2 settings, control panel enabled/disabled settings, and so on. Pattern data related to the companion software includes all scanning monitor parameters, all "view" menu settings (e.g., CA/LL switcher panel display, clock display, student information panel display, source control panel display, student unit status display, seat numbers display, monitor marks display, etc.), and all "user option" settings, all as previously discussed. In other words, all information relating to the setup of all of the hardware systems in the learning system of the present invention including button/knob settings and switching settings and all information pertaining to the setup of the companion software, including scanning information, the appearance of the main and other windows, and other settings for the companion software, for a single class (or alternatively, multiple classes) are stored in a "pattern" of a pattern file. After the teacher sets up the learning system and companion software as desired, such set up may be stored as a pattern and subsequently be retrieved by the teacher prior to each class. In addition, a teacher may have multiple patterns for a particular class, wherein a first pattern is used for one portion of a class and another pattern is used for another portion of the class. For example, a first pattern may be used during an instructional stage of a class, and a second pattern may be used for a testing stage of the class.

Figure 23:
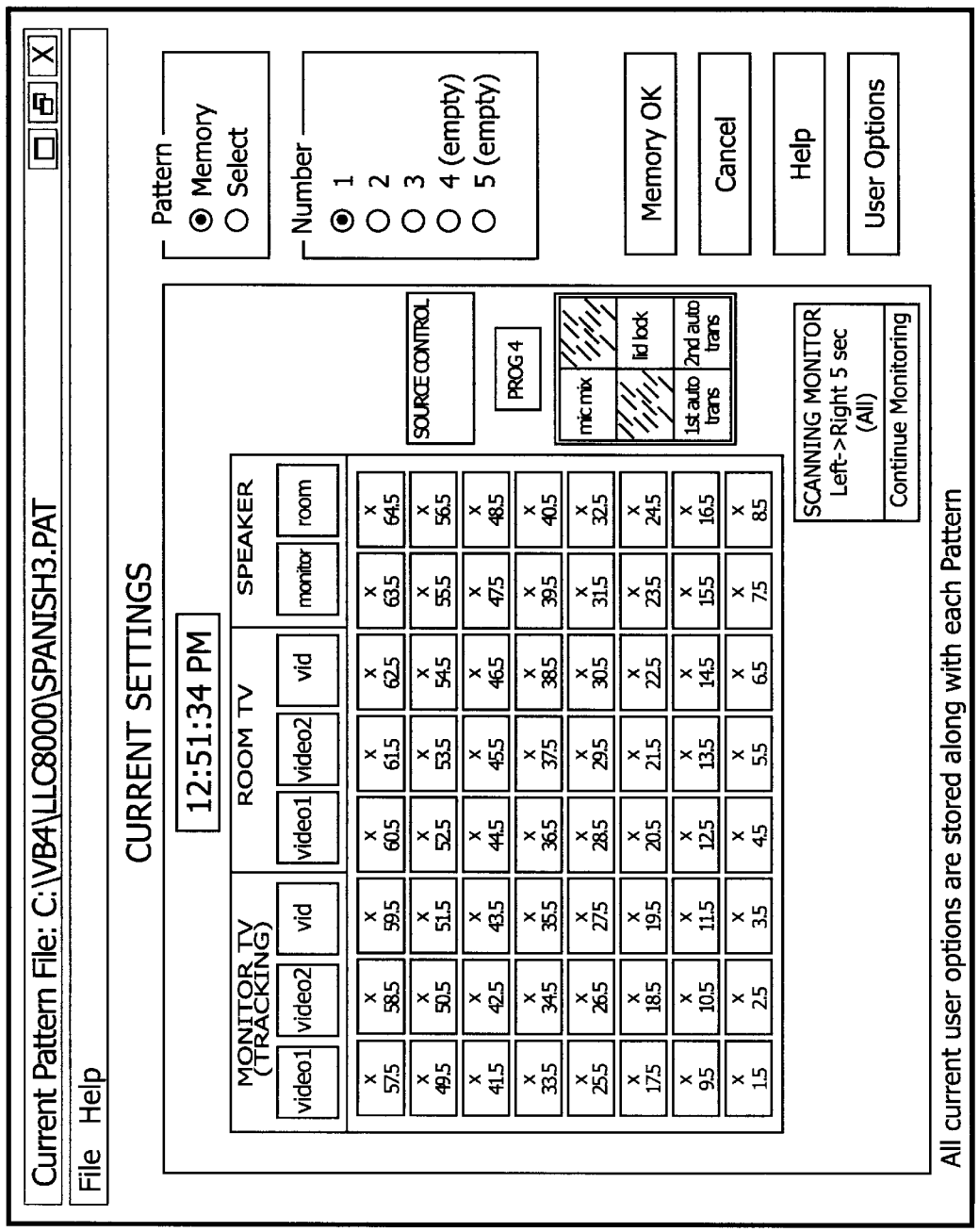
FIG. 23 is an illustration of an exemplary pattern dialogue which assists the user in saving and opening pattern files.

The companion software includes a dialogue, such as shown in FIG. 23, to assist the teacher with saving and opening pattern files, and with storing and recalling the pattern data. As shown, the pattern dialogue includes a small representation of much of the companion software main screen which displays either the current settings of the data that make a pattern, or the settings of each of, for example, five patterns stored in a pattern file. The teacher may then "preview" the pattern settings before recalling the pattern data. Thus, patterns can be previewed prior to distributing to the class.

While the present invention has been particularly shown and described in conjunction with preferred embodiments and features thereof, it will be readily appreciated by those of ordinary skill in the art that various changes may be made without departing from the spirit and scope of the invention. For example, although the learning system of the present invention has been described with reference to the learning of a foreign language, the present invention is not limited to foreign languages and may be applied to the learning of other areas, for example, arts, sciences, etc.

As another example, although the companion software is described as including a main window, a number of other windows, and a number of dialogues, the present invention is not limited solely to the arrangement as described and may be widely applied to a learning system being operated by software that provides information to the user in other manners and formats.

Therefore, it is intended that the appended claims be interpreted as including the embodiments described herein, the alternatives mentioned above, and all equivalents thereto.

What is claimed is:

1. A learning system, comprising:
   a plurality of student units, each of said student units adapted to be utilized by a respective one of a plurality of students and including a computer and a respective display for displaying information to the respective student; and
   a teacher unit having a display and a computer utilizing a graphic user interface, said teacher computer being operable to control a switching device to couple a selected one of said student computers with said teacher computer so that said teacher computer can control a function of said selected student computer via said switching device, said switching device also being operable to couple various combinations of the teacher and student computers independent of control of said teacher computer.

2. The learning system of claim 1, wherein said graphical user interface and display of said teacher computer displays teacher selected information and an input device receives from a teacher display information identifying a selected one of said student computers to control the display thereof; and said teacher computer, in response to receiving the display information, controls the switching device to supply the displayed teacher selected information to the selected student computer so that the display of the selected student computer only displays the displayed teacher selected information.

3. The learning system of claim 2, wherein said teacher computer displays a switcher panel having a plurality of functions therein; said teacher supplies said display information identifying the selected one of said student computers by means of selecting one of the functions in the displayed switcher panel; and said computer removes said switcher panel from the display when the switching device is controlled to supply the displayed teacher selected information to the selected student computer.

4. The learning system of claim 1, wherein each of said students is assigned to one of a plurality of groups; said graphical user interface and display of said teacher computer displays teacher selected information and an input device receives from a teacher a teacher display send instruction including a selected group; and said teacher computer, in response to receiving the teacher display send instruction, controls the switching device to supply the displayed teacher selected information to each of said student computers utilized by students assigned to the selected group so that the display of each of said student computers only displays the displayed teacher selected information.

5. The learning system of claim 1, wherein said teacher computer includes an input device for receiving from a teacher blanking information identifying at least a selected one of said student computers to blank the display thereof; and said teacher computer, in response to receiving the blanking information, controls the switching device to blank the display of the selected student computer.

6. The learning system of claim 1, wherein said teacher computer includes an input device for receiving from a teacher control information identifying a selected one of said student computers to control and including at least one input control command relating to the control of the selected student computer; and said teacher computer, in response to receiving the control information, supplies a student input command signal relating to the input control command received from the teacher and controls the switching device to supply the student input command signal to the selected student computer so that the selected student computer is controlled in accordance with the student input command signal.

7. The learning system of claim 6, wherein each of said student computers includes a respective student input device for receiving instructions from the respective student; and said student input command signal supplied by the teacher computer corresponds to instructions to be supplied to the student input device of the selected student computer.

8. The learning system of claim 7, wherein the selected student computer is inhibited from receiving instructions from the respective student by means of the respective student input device when the switching device is supplying the student input command signal to the selected student computer.

9. The learning system of claim 7, wherein the student input command signal corresponds to keyboard and/or mouse commands of the selected student computer.

10. The learning system of claim 6, wherein each of said student computers includes a respective student input device for receiving instructions from the respective student; the control information received from the teacher is comprised of a student identifier identifying the selected student computer to control followed by a plurality of inputs by the teacher; and the selected student computer is controlled in accordance with said inputs as if said inputs were received by the respective student input device of the selected student computer.

11. The learning system of claim 10, wherein said teacher computer, in response to receiving the student identifier, controls the selected student computer in accordance with said inputs by the teacher until a teacher selected condition is satisfied.

12. The learning system of claim 11, wherein said teacher computer controls the selected student computer until a pre-selected amount of time elapses after receiving the student identifier.

13. The learning system of claim 11, wherein said teacher computer is inhibited from being controlled by the teacher when the selected student computer is being controlled in accordance with the inputs by the teacher.

14. The learning system of claim 11, wherein the teacher unit includes an input device separate from the input device of the teacher computer; and the teacher computer controls the selected student computer until the teacher supplies a predetermined input to the input device of the teacher unit.

15. The learning system of claim 10, wherein the teacher unit includes a second teacher computer for receiving inputs by the teacher; and the selected student computer is controlled in accordance with the inputs received by the second teacher computer.

16. The learning system of claim 6, wherein said teacher computer includes a display; said teacher computer, in response to receiving the control information, further controls the switching device to supply a display signal from the selected student computer corresponding to an image being displayed on the display of the selected student computer to the teacher computer; and said teacher computer controls its display to display the image being displayed by the selected student computer as provided by the display signal.

17. The learning system of claim 16, wherein said teacher computer controls its display to display the image being displayed by the selected student computer while the selected student computer is controlled in accordance with the student input command signal.

18. A learning system, comprising:
   a plurality of student means, each of said student means being adapted to be utilized by a respective one of a plurality of students;
   switching means for switching between at least a selected one of said student means; and control means having a display and a graphical user interface for controlling each of said student means and said switching means, said control means being operable to control said switching means to couple a selected one of said student means with said control means so that said control means can control a function of said selected student means via said switching means, said switching means also being operable to couple various combinations of the teacher and student means independent of control of said teacher means.

19. The learning system of claim 18, wherein said control means includes display means for displaying teacher selected information and input means for receiving from a teacher display information identifying a selected one of said student means to control the display of information thereby; and said control means, in response to receiving the display information, controls the switching means to supply the displayed teacher selected information to the selected student means so that the selected student means only displays the displayed teacher selected information.

20. The learning system of claim 19, wherein said display means of said control means displays a switcher panel having a plurality of functions therein; said teacher supplies said display information identifying the selected one of said student means by means of selecting one of the functions in the displayed switcher panel; and said control means controls the display means to not display said switcher panel when the switching means is controlled to supply the displayed teacher selected information to the selected student means.

21. The learning system of claim 18, wherein each of said students is assigned to one of a plurality of groups; said control means includes display means for displaying teacher selected information and input means for receiving from a teacher a teacher display send instruction including a selected group; and said control means, in response to receiving the teacher display send instruction, controls the switching means to supply the displayed teacher selected information to each of said student means utilized by students assigned to the selected group so that said each of said student means only display the displayed teacher selected information.

22. The learning system of claim 18, wherein said control means includes input means for receiving from a teacher blanking information identifying at least a selected one of said student means to blank; and said control means, in response to receiving the blanking information, controls the switching means to blank a display of the selected student means.

23. The learning system of claim 18, wherein said control means includes input means for receiving from a teacher control information identifying a selected one of said student means to control and including at least one input control command relating to the control of the selected student means; and said control means, in response to receiving the control information, supplies a student input command signal relating to the input control command received from the teacher and controls the switching means to supply the student input command signal to the selected student means so that the selected student means is controlled in accordance with the student input command signal.

24. The learning system of claim 23, wherein each of said student means includes a respective student input means for receiving instructions from the respective student; and said student input command signal supplied by the control means corresponds to instructions to be supplied to the student input means of the selected student means.

25. The learning system of claim 24, wherein the selected student means is inhibited from receiving instructions from the respective student by means of the respective student input means when the switching means is supplying the student input command signal to the selected student means.

26. The learning system of claim 24, wherein the student input command signal corresponds to keyboard and/or mouse commands of the selected student means.

27. The learning system of claim 23, wherein each of said student means includes a respective student input means for receiving instructions from the respective student; the control information received from the teacher is comprised of a student identifier identifying the selected student means to control followed by a plurality of inputs by the teacher; and the selected student means is controlled in accordance with said inputs as if said inputs were received by the respective student input means of the selected student means.

28. The learning system of claim 27, wherein said control means, in response to receiving the student identifier, controls the selected student means in accordance with said inputs by the teacher until a teacher selected condition is satisfied.

29. The learning system of claim 28, wherein said control means controls the selected student means until a preselected amount of time elapses after receiving the student identifier.

30. The learning system of claim 28, wherein said teacher is inhibited from controlling said control means when the selected student means is being controlled in accordance with the inputs by the teacher.

31. The learning system of claim 28, wherein said control means includes a second input means; and the control means controls the selected student means until the teacher supplies a predetermined input to the second input means.

32. The learning system of claim 27, further comprising second control means for receiving inputs by the teacher; and the selected student means is controlled in accordance with the inputs received by the second control means.

33. The learning system of claim 23, wherein said control means includes display means for displaying an image to the teacher; said control means, in response to receiving the control information, further controls the switching means to supply a display signal from the selected student means corresponding to an image being displayed by the selected student means to the control means; and said control means controls said display means to display the image being displayed by the selected student means as provided by the display signal.

34. The learning system of claim 33, wherein said control means controls said display means to display the image being displayed by the selected student means while the selected student means is controlled in accordance with the student input command signal.

35. A method of controlling a learning system having a plurality of student units including student computers for use by students and a teacher unit having a teacher computer with a display and a graphic user input, comprising the steps of:

displaying information by respective displays of said plurality of student computers to a plurality of students;

switching by a switching device signals between at least a selected one of said student computers and said computer of said teacher unit;

controlling by said teacher computer the switching device to couple a selected one of said student computers with said teacher computer so that said teacher computer can control a function of said selected student computer via said switching device; and controlling coupling of various combinations of the teacher and student computers independent of control of said teacher computer.

36. The method of claim 35, further comprising the steps of displaying by said teacher computer teacher selected information and receiving from a teacher display information identifying a selected one of said student computers to control the display thereof; and said controlling step is carried out by controlling the switching device to supply the displayed teacher selected information to the selected student computer so that the display of the selected student computer only displays the displayed teacher selected information.

37. The method of claim 36, further comprising the step of displaying by said teacher computer a switcher panel having a plurality of functions therein; said receiving from said teacher step is carried out by selecting one of the functions in the displayed switcher panel; and said method further comprises the step of not displaying said switcher panel by said teacher computer when the switching device is controlled to supply the displayed teacher selected information to the selected student computer.

38. The method of claim 35, wherein each of said students is assigned to one of a plurality of groups; said method further comprising the steps of displaying by said teacher computer teacher selected information and receiving from a teacher a teacher display send instruction including a selected group; and said controlling step is carried out by controlling the switching device to supply the displayed teacher selected information to each of said student computers utilized by students assigned to the selected group so that the displays of said each of said student computers only displays the displayed teacher selected information.

39. The method of claim 35, further comprising the step of receiving from a teacher blanking information identifying at least a selected one of said student computers to blank the display thereof; and said controlling step is carried out by controlling the switching device to blank the display of the selected student computer.

40. The method of claim 35, further comprising the steps of receiving from a teacher control information identifying a selected one of said student computers to control and including at least one input control command relating to the control of the selected student computer; and supplying by said teacher computer a student input command signal relating to the input control command received from the teacher; and said controlling step is carried out by controlling the switching device to supply the student input command signal to the selected student computer so that the selected student computer is controlled in accordance with the student input command signal.

41. The method of claim 40, wherein said student input command signal supplied by the teacher computer corresponds to instructions supplied to a student input device of the selected student computer.

42. The method of claim 41, further comprising the step of inhibiting the selected student computer from receiving instructions from the respective student when the switching device is supplying the student input command signal to the selected student computer.

43. The method of claim 41, wherein the student input command signal corresponds to keyboard and/or mouse commands of the selected student computer.

44. The method of claim 40, wherein the control information received from the teacher is comprised of a student identifier identifying the selected student computer to control followed by a plurality of inputs by the teacher; and the controlling step is carried out in accordance with said inputs as if said inputs were received by a student input device of the selected student computer.

45. The method of claim 44, wherein the controlling step is carried out until a teacher selected condition is satisfied.

46. The method of claim 45, wherein said controlling step is carried out until a pre-selected amount of time elapses after receiving the student identifier.

47. The method of claim 45, further comprising the step of inhibiting the teacher computer from being controlled by the teacher when the selected student computer is being controlled in accordance with the inputs by the teacher.

48. The method of claim 45, wherein the controlling step is carried out until the teacher supplies a predetermined input to an input device of a teacher unit separate from the teacher computer.

49. The method of claim 44, wherein the controlling step is carried out in accordance with inputs received by a second teacher computer.

50. The method of claim 40, further comprising the steps of controlling the switching device to supply a display signal from the selected student computer corresponding to an image being displayed thereon to the teacher computer; and displaying on said teacher computer the image being displayed by the selected student computer as provided by the display signal.

51. The method of claim 50, wherein said step of displaying on said teacher computer the image being displayed by the selected student computer is carried out while the selected student computer is controlled in accordance with the student input command signal.

* * * * *